US012713489B2

(12) United States Patent
Raghavan et al.

(10) Patent No.: US 12,713,489 B2
(45) Date of Patent: Aug. 18, 2026

(54) BEAM COMBINING SELECTION BASED ON BEAMFORMING ARCHITECTURE

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 344 days.

(21) Appl. No.: 18/595,084

(22) Filed: Mar. 4, 2024

(65) Prior Publication Data

US 2025/0280464 A1 Sep. 4, 2025

(51) Int. Cl.
*H04W 76/20* (2018.01)
*H04W 8/22* (2009.01)
*H04W 16/28* (2009.01)

(52) U.S. Cl.
CPC ............ *H04W 76/20* (2018.02); *H04W 8/22* (2013.01); *H04W 16/28* (2013.01)

(58) Field of Classification Search
CPC ....... H04W 76/20; H04W 8/22; H04W 16/28; H04B 7/0691; H04B 7/0874
See application file for complete search history.

(56) References Cited

U.S. PATENT DOCUMENTS

2019/0132846 A1* 5/2019 Yong ..................... H04W 48/08
2021/0068077 A1* 3/2021 Raghavan ............ H04B 7/0802
2024/0022281 A1 1/2024 Raghavan et al.
2024/0155637 A1* 5/2024 Wang .................... H04L 5/0057

OTHER PUBLICATIONS

CHTTL: "Discussion on new UE RF Architecture Capability for Intra-band EN-DC and intra-band NR UL CAH", TSG-RAN Working Group 4 (Radio) meeting #89, R4-1815213, 3rd Generation Partnership Project, Mobile Competence Centre, 650, Route Des Lucioles, F-06921, Sophia-Antipolis Cedex, France, vol. TSG RAN, No. Spokane, USA, Nov. 12, 2018-Nov. 16, 2018, Nov. 2, 2018, XP051483860, 2 Pages, Section 1 "Introduction".
International Search Report and Written Opinion—PCT/US2025/014831—ISA/EPO—May 23, 2025.

* cited by examiner

*Primary Examiner* — Ayaz R Sheikh
*Assistant Examiner* — Mang Boi Thawng
(74) *Attorney, Agent, or Firm* — Loza & Loza LLP

(57) ABSTRACT

Aspects relate to mechanisms for a UE to indicate the supported beam combining types to the network based on the beamforming architecture of the UE. In some examples, the UE may be configured to transmit transmission configuration indicator (TCI) state information to a network entity. The TCI state information may include, for example, a single TCI state or multiple TCI states based on a UE capability to support RF beam combining, IF beam combining, and/or BB beam combining of beamformed signals across one or more antenna modules of the UE. The UE may further receive a downlink transmission from the network entity using one or more selected TCI states based on the TCI state information.

30 Claims, 19 Drawing Sheets

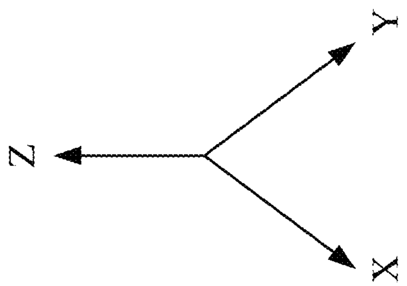
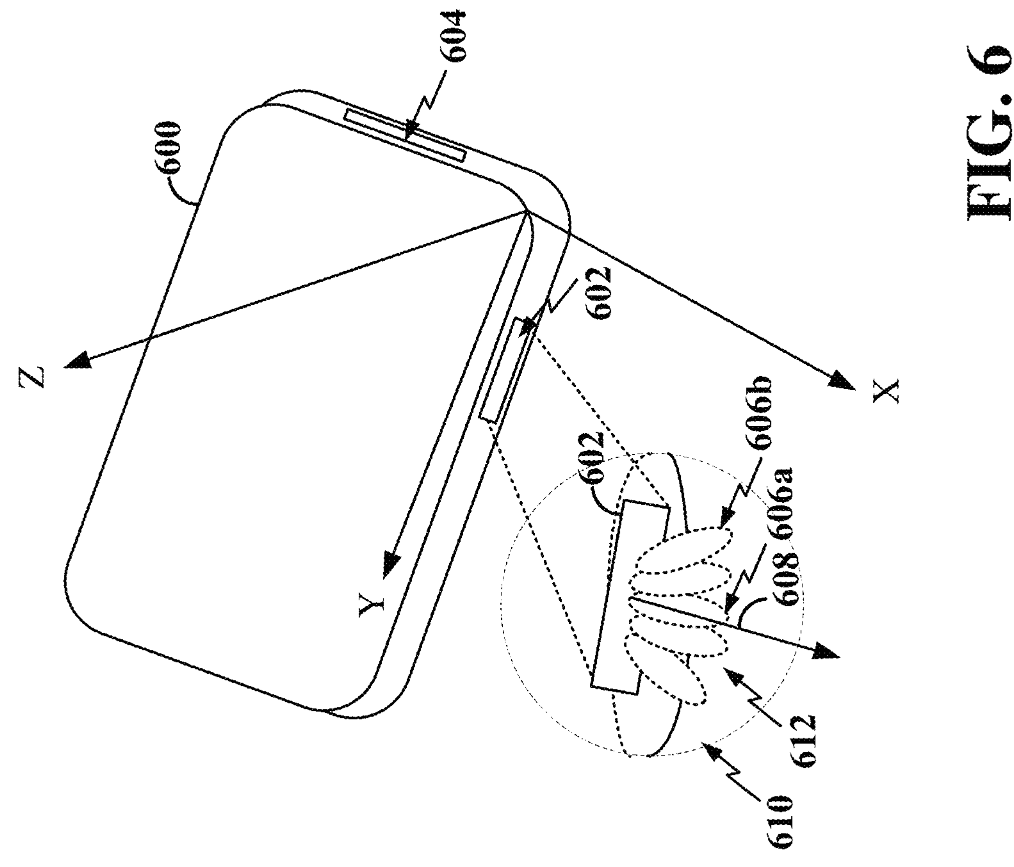
FIG. 6

902

904

| | RF Combining | IF Combining | BB Combining |
|---|---|---|---|
| No. of RFICs | 1 | >1 | |
| No. of RF chains | 1 per polarization | 1 per polarization | >1 per polarization |
| Antenna Module Configuration | Co-Located/Non-Co-Located Sides | Any separation between antenna modules | |
| Feedline Loss | Increases as sides get separated | Minimal | |
| Cost | Increased cost for single RFIC flex design | Increased cost due to multiple RFICs and multiple RF/IF connectors | |
| Diversity to hand blockage | Less since multiple co-located sides blocked | More since antenna modules can be independently located | |
| Performance Gains | Higher due to increased overlap region | Smaller due to less overlap region | |
| Amplitude and Phase Control | Limited amplitude and phase | Amplitude: Rx fine gain control; Limited phase control | Amplitude: Rx AGD outer loop control; Limited phase control |
| Thermal Overhead | Higher | Lower | |
| Power Consumption | Possibly Lower at BB Level | Possibly Higher at BB Level | |

FIG. 9

BEAM COMBINING SELECTION BASED ON BEAMFORMING ARCHITECTURE

TECHNICAL FIELD

The technology discussed below relates generally to wireless communication systems, and more particularly, to beamforming architectures and beam combining in wireless communication systems.

INTRODUCTION

Wireless communication systems, such as those specified under fifth generation (5G) systems, referred to as New Radio (NR) systems, sixth generation (6G) systems, and other future generations, a network entity and user equipment (UE) may utilize beamforming to compensate for high path loss and short range. Beamforming is a signal processing technique used with an antenna array module for directional signal transmission and/or reception. Each antenna in the antenna array module transmits a signal that is combined with other signals of other antennas of the same array in such a way that signals at particular angles experience constructive interference while others experience destructive interference.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, an apparatus for wireless communication at a user equipment (UE) includes one or more antenna modules, one or more memories and one or more processors coupled to the one or more memories and the one or more antenna modules. The one or more processors can be configured to transmit transmission configuration indicator (TCI) state information to a network entity. The TCI state information includes at least one of a single TCI state or multiple TCI states based on a UE capability to support one or more of radio frequency (RF) combining, intermediate frequency (IF) combining, or baseband (BB) combining of beamformed signals across one or more antenna modules of the UE. The one or more processors can further be configured to receive a downlink transmission from the network entity. The downlink transmission can use one or more selected TCI states based on the TCI state information.

Another example provides a method operable at a user equipment (UE). The method includes transmitting transmission configuration indicator (TCI) state information to a network entity. The TCI state information includes at least one of a single TCI state or multiple TCI states based on a UE capability to support one or more of radio frequency (RF) combining, intermediate frequency (IF) combining, or baseband (BB) combining of beamformed signals across one or more antenna modules of the UE. The method further includes receiving a downlink transmission from the network entity. The downlink transmission can use one or more selected TCI states based on the TCI state information.

Another example provides apparatus for wireless communication at a network entity. The apparatus includes one or more memories and one or more processors coupled to the one or more memories. The one or more processors are configured to obtain transmission configuration indicator (TCI) state information associated with a user equipment (UE). The TCI state information includes at least one of a single TCI state or multiple TCI states based on a UE capability to support one or more of radio frequency (RF) combining, intermediate frequency (IF) combining, or baseband (BB) combining of beamformed signals across one or more antenna modules of the UE. The one or more processors are further configured to provide a downlink transmission using one or more selected TCI states based on the TCI state information Another example provides a method operable at a network entity. The method includes obtaining transmission configuration indicator (TCI) state information associated with a user equipment (UE). The TCI state information includes at least one of a single TCI state or multiple TCI states based on a UE capability to support one or more of radio frequency (RF) combining, intermediate frequency (IF) combining, or baseband (BB) combining of beamformed signals across one or more antenna modules of the UE. The method further includes providing a downlink transmission using one or more selected TCI states based on the TCI state information.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 6 is a diagram illustrating an example of antenna modules of a wireless communication device according to some aspects.

FIG. 9 is a diagram illustrating exemplary UE factors for selection of a beam combining type according to some aspects.

DETAILED DESCRIPTION

Figure 1:
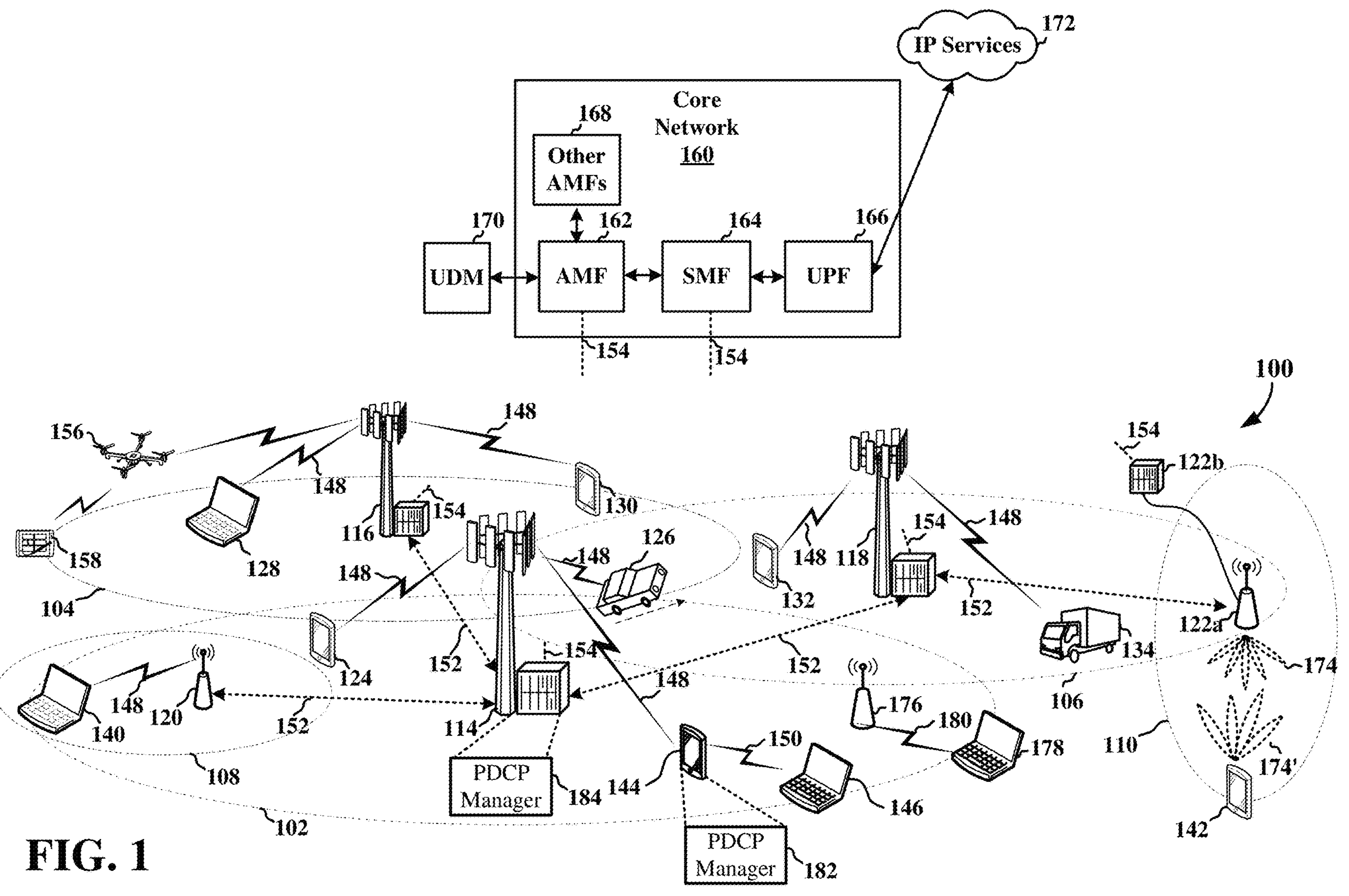
FIG. 1 is a diagram illustrating an example of a wireless communication system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., network entity and/or UE), end-user devices, etc., of varying sizes, shapes, and constitution.

In millimeter wave systems, multiple antennas of an antenna module, and multiple antenna modules (e.g., antenna arrays), are used at the network entity and the user equipment (UE) to facilitate beamforming. In addition, UEs may be configured with different beamforming architectures to support different types of beam combining, including radio frequency (RF) beam combining, intermediate frequency (IF) beam combining, and/or baseband (BB) beam combining.

Various aspects are related to mechanisms for a UE to indicate the supported beam combining types to the network based on the beamforming architecture of the UE. In some examples, the UE may be configured to transmit transmission configuration indicator (TCI) state information to a network entity. The TCI state information may include, for example, a single TCI state or multiple TCI states based on a UE capability to support RF beam combining, IF beam combining, and/or BB beam combining of beamformed signals across one or more antenna modules of the UE. Each TCI state included in the TCI state information may represent a preferred TCI state for the UE to receive a downlink transmission from the network entity. The network entity may then select one or more selected TCI states for the downlink transmission based on the TCI state information.

In examples in which the UE supports RF combining, the TCI state information may include the single TCI state. For example, the UE beamforming architecture may include one or more antenna modules controlled by a single RF integrated circuit (RFIC) chip. In some examples, the one or more antenna modules may include a co-located antenna module including at least two antenna module sections positioned on different sides of the UE. In other examples, the one or more antenna modules may include a distributed antenna module including at least two antenna module sections coupled via n RF connector.

In examples in which the UE supports at least one of IF combining and/or BB combining, the TCI state information may include the multiple TCI states. For example, the UE beamforming architecture may include multiple antenna modules, each being controlled by a different respective RFIC chip. In examples in which the UE supports both RF combining and at least one of IF combining and/or BB combining, the TCI state information may include both the single TCI state (e.g., for RF combining) and the multiple TCI states (for IF combining and/or BB combining). For example, the UE beamforming architecture may include the co-located antenna module or the distributed antenna module.

In addition, various aspects are related to switching between the different types beam combining based on the beamforming architecture of the UE. In some examples, the UE may switch between RF combining and IF/BB combining based on various UE factors to select a certain beam combining type and transmit the TCI state information in accordance with the selected beam combining type. Examples of UE factors may include, but are not limited to, a number of RFIC chips on the UE, feedline losses between the antenna modules or antenna module sections, a power consumption tolerance of the UE, or a thermal overhead tolerance of the UE. In other examples, the network entity may transmit the one or more selected TCI states for the downlink transmission to the UE based on the TCI state information including both a single TCI state (e.g., for RF combining) and multiple TCI states (e.g., for IF/BB combining). The UE may then switch between RF combining and IF/BB combining based on the one or more selected TCI states for the downlink transmission.

The various concepts presented throughout this disclosure may be implemented across a broad variety of telecommunication systems, network architectures, and communication standards. Referring now to FIG. 1, as an illustrative example without limitation, a schematic illustration of a wireless communication network including a radio access network (RAN) 100 and a core network 160 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In other examples, the RAN 100 may operate according to a hybrid of 5G NR and 6G, may operate according to 6G, or may operate according to other future radio access technology (RAT). Of course, many other examples may be utilized within the scope of the present disclosure.

The geographic region covered by the RAN 100 may be divided into a number of cellular regions (cells) that can be uniquely identified by a user equipment (UE) based on an identification broadcasted over a geographical area from one access point or network entity. FIG. 1 illustrates cells 102, 104, 106, 108, and 110 each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective network entity serves each cell. Broadly, a network entity is responsible for radio transmission and reception in one or more cells to or from a UE. A network entity may also be referred to by those skilled in the art as a base station (e.g., an aggregated base station or disaggregated base station), base transceiver station (BTS), a radio base station, a radio transceiver, a transceiver function, a basic service set (BSS), an extended service set (ESS), an access point (AP), a Node B (NB), an evolved NB (eNB), a 5G NB (gNB), a transmission receive point (TRP), or some other suitable terminology. In some examples, a network entity may include two or more TRPs that may be collocated or non-collocated. Each TRP may communicate on the same or different carrier frequency within the same or different frequency band. In examples where the RAN 100 operates according to both the LTE and 5G NR standards, one of the network entities may be an LTE network entity, while another network entity may be a 5G NR network entity.

In some examples, the RAN 100 may employ an open RAN (O-RAN) to provide a standardization of radio interfaces to procure interoperability between component radio equipment. For example, in an O-RAN, the RAN may be disaggregated into a centralized unit (CU), a distributed unit (DU), and a radio unit (RU). The RU is configured to transmit and/or receive (RF) signals to and/or from one or more UEs. The RU may be located at, near, or integrated with, an antenna. The DU and the CU provide computational functions and may facilitate the transmission of digitized radio signals within the RAN 100. In some examples, the DU may be physically located at or near the RU. In some examples, the CU may be located near the core network 160.

The DU provides downlink and uplink baseband processing, a supply system synchronization clock, signal processing, and an interface with the CU. The RU provides downlink baseband signal conversion to an RF signal, and uplink RF signal conversion to a baseband signal. The O-RAN may include an open fronthaul (FH) interface between the DU and the RU. Aspects of the disclosure may be applicable to an aggregated RAN and/or to a disaggregated RAN (e.g., an O-RAN).

Various network entity arrangements can be utilized. For example, in FIG. 1, network entities 114, 116, and 118 are shown in cells 102, 104, and 106; and another network entity 122 is shown controlling a remote radio head (RRH) 122 in cell 110. That is, a network entity can have an integrated antenna or can be connected to an antenna or RRH by feeder cables. In the illustrated example, the cells 102, 104, 106, and 110 may be referred to as macrocells, as the network entities 114, 116, 118, and 122 support cells having a large size. Further, a network entity 120 is shown in the cell 108 which may overlap with one or more macrocells. In this example, the cell 108 may be referred to as a small cell (e.g., a microcell, picocell, femtocell, home base station, home Node B, home eNode B, etc.), as the network entity 120 supports a cell having a relatively small size. Cell sizing can be done according to system design as well as component constraints.

It is to be understood that the RAN 100 may include any number of network entities and cells. Further, a relay node may be deployed to extend the size or coverage area of a given cell. In some examples, a cell may not necessarily be stationary, and the geographic area of the cell may move according to the location of a mobile network entity.

FIG. 1 further includes an unmanned aerial vehicle (UAV) 156, which may be a drone or quadcopter. The UAV 156 may be configured to function as a network entity, or more specifically as a mobile network entity. That is, in some examples, a cell may not necessarily be stationary, and the geographic area of the cell may move according to the location of a mobile network entity such as the UAV 156.

In addition to other functions, the network entities 114, 116, 118, 120, and **122*a*/122*b* may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The network entities 114, 116, 118, 120, and 122***a*/122*b* may communicate directly or indirectly (e.g., through the core network 170) with each other over backhaul links 152 (e.g., X2 interface). The backhaul links 152 may be wired or wireless.

The RAN 100 is illustrated supporting wireless communication for multiple mobile apparatuses. A mobile apparatus is commonly referred to as user equipment (UE) in standards and specifications promulgated by the 3$^{rd}$ Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 124, 126, and 144 may be in communication with network entity 114; UEs 128 and 130 may be in communication with network entity 116; UEs 132 and 138 may be in communication with network entity 118; UE 140 may be in communication with network entity 120; UE 142 may be in communication with network entity 122*a* via RRH 122*b*; and UE 158 may be in communication with mobile network entity 156. Here, each network entity 114, 116, 118, 120, 122*a*/122*b*, and 156 may be configured to provide an access point to the core network 170 (not shown) for all the UEs in the respective cells. In another example, a mobile network node (e.g., UAV 156) may be configured to function as a UE. For example, the UAV 156 may operate within cell 104 by communicating with network entity 116. UEs may be located anywhere within a serving cell. UEs that are located closer to a center of a cell (e.g., UE 132) may be referred to as cell center UEs, whereas UEs that are located closer to an edge of a cell (e.g., UE 134) may be referred to as cell edge UEs. Cell center UEs may have a higher signal quality (e.g., a higher reference signal received power (RSRP) or signal-to interference-plus-noise ratio (SINR)) than cell edge UEs.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call facilitated by a network entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE May undertake a handoff or handover from the serving cell to the neighboring (target) cell. For example, UE 126 may move from the geographic area corresponding to its serving cell 102 to the geographic area corresponding to a neighbor cell 106. When the signal strength or quality from the neighbor cell 106 exceeds that of its serving cell 102 for a given amount of time, the UE 126 may transmit a reporting message to its serving network entity 114 indicating this condition. In response, the UE 126 may receive a handover command, and the UE may undergo a handover to the cell 106.

Wireless communication between a RAN 100 and a UE (e.g., UE 124, 126, or 144) may be described as utilizing communication links 148 over an air interface. Transmissions over the communication links 148 between the network entities and the UEs may include uplink (UL) (also referred to as reverse link) transmissions from a UE to a network entity and/or downlink (DL) (also referred to as forward link) transmissions from a network entity to a UE. For example, DL transmissions may include unicast or broadcast transmissions of control information and/or data (e.g., user data traffic or other type of traffic) from a network entity (e.g., network entity 114) to one or more UEs (e.g., UEs 124, 126, and 144), while UL transmissions may include transmissions of control information and/or traffic information originating at a UE (e.g., UE 124). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The communication links 148 may use multiple-input and multiple-output (MIMO) antenna technology, including spatial multiplexing, beamforming, and/or transmit diversity. For example, as shown in FIG. 1, network entity 122*a*/122*b* may transmit a beamformed signal to the UE 142 via one or more beams 174 in one or more transmit directions. The UE 142 may further receive the beamformed signal from the network entity 122*a*/122*b* via one or more beams 174' in one or more receive directions. The UE 142 may also transmit a beamformed signal to the network entity 122*a*/122*b* via the one or more beams 174' in one or more transmit directions. The network entity 122*a*/122*b* may further receive the beamformed signal from the UE 142 via the one or more beams 174 in one or more receive directions. The network entity 122*a*/122*b* and the UE 142 may perform beam training to determine the best transmit and receive beams 174/174' for communication between the network entity 122*a*/122*b* and the UE 142. The transmit and receive beams for the network entity 122*a*/122*b* may or may not be the same. The transmit and receive directions for the UE 142 may or may not be the same.

The communication links 148 may utilize one or more carriers. The network entities and UEs may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The communication links 148 in the RAN 100 may further utilize one or more multiplexing and multiple access algorithms to enable simultaneous communication of the various devices. For example, 5G NR specifications provide multiple access for UL or reverse link transmissions from UEs 124, 126, and 144 to network entity 114, and for multiplexing DL or forward link transmissions from the network entity 114 to UEs 124, 126, and 144 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the network entity 114 to UEs 124, 126, and 144 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the communication links 148 in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the communication links 148 in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

In some examples, access to the air interface may be scheduled, wherein a scheduling entity (e.g., a network entity 114) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 124), which may be scheduled entities, may utilize resources allocated by the scheduling entity 114.

Network entities are not the only entities that may function as scheduling entities. That is, in some examples, a UE may function as a scheduling entity, scheduling resources for one or more scheduled entities (e.g., one or more other UEs). For example, two or more UEs (e.g., UEs 144 and 146) may communicate with each other using peer to peer (P2P) or sidelink signals via a sidelink 150 therebetween without relaying that communication through a network entity (e.g., network entity 114). In some examples, the UEs 144 and 146 may each function as a scheduling entity or transmitting sidelink device and/or a scheduled entity or a receiving sidelink device to communicate sidelink signals therebetween without relying on scheduling or control information from a network entity (e.g., network entity 114). In other examples, the network entity 114 may allocate resources to the UEs 144 and 146 for sidelink communication. For example, the UEs 144 and 146 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from the network entity 114 via D2D links (e.g., sidelink 150). For example, one or more UEs (e.g., UE 144) within the coverage area of the network entity 114 may operate as a relaying UE to extend the coverage of the network entity 114, improve the transmission reliability to one or more UEs (e.g., UE 146), and/or to allow the network entity to recover from a failed UE link due to, for example, blockage or fading.

The wireless communications system may further include a Wi-Fi access point (AP) 176 in communication with Wi-Fi stations (STAs) 178 via communication links 180 in a 5 GHz unlicensed frequency spectrum. When communicating in an unlicensed frequency spectrum, the STAs 170/AP 176 may perform a clear channel assessment (CCA) prior to communicating in order to determine whether the channel is available.

The network entities 114, 116, 118, 120, and **122*a*/122*b* provide wireless access points to the core network 160 for any number of UEs or other mobile apparatuses via core network backhaul links 154. The core network backhaul links 154 may provide a connection between the network entities 114, 116, 118, 120, and 122*a*/122*b* and the core network 170. In some examples, the core network backhaul links 154 may include backhaul links 152 that provide interconnection between the respective network entities. The core network may be part of the wireless communication system and may be independent of the radio access technology used in the RAN 100**. Various types of backhaul interfaces may be employed, such as a direct physical connection (wired or wireless), a virtual network, or the like using any suitable transport network.

The core network 160 may include an Access and Mobility Management Function (AMF) 162, other AMFs 168, a Session Management Function (SMF) 164, and a User Plane Function (UPF) 166. The AMF 162 may be in communication with a Unified Data Management (UDM) 170. The AMF 162 is the control node that processes the signaling between the UEs and the core network 160. Generally, the AMF 162 provides QoS flow and session management. All user Internet protocol (IP) packets are transferred through the UPF 166. The UPF 166 provides UE IP address allocation as well as other functions. The UPF 166 is configured to couple to IP Services 172. The IP Services 172 may include the Internet, an intranet, an IP Multimedia Subsystem (IMS), a PS Streaming Service, and/or other IP services.

Figures 2A, 2B, 2C, 2D:
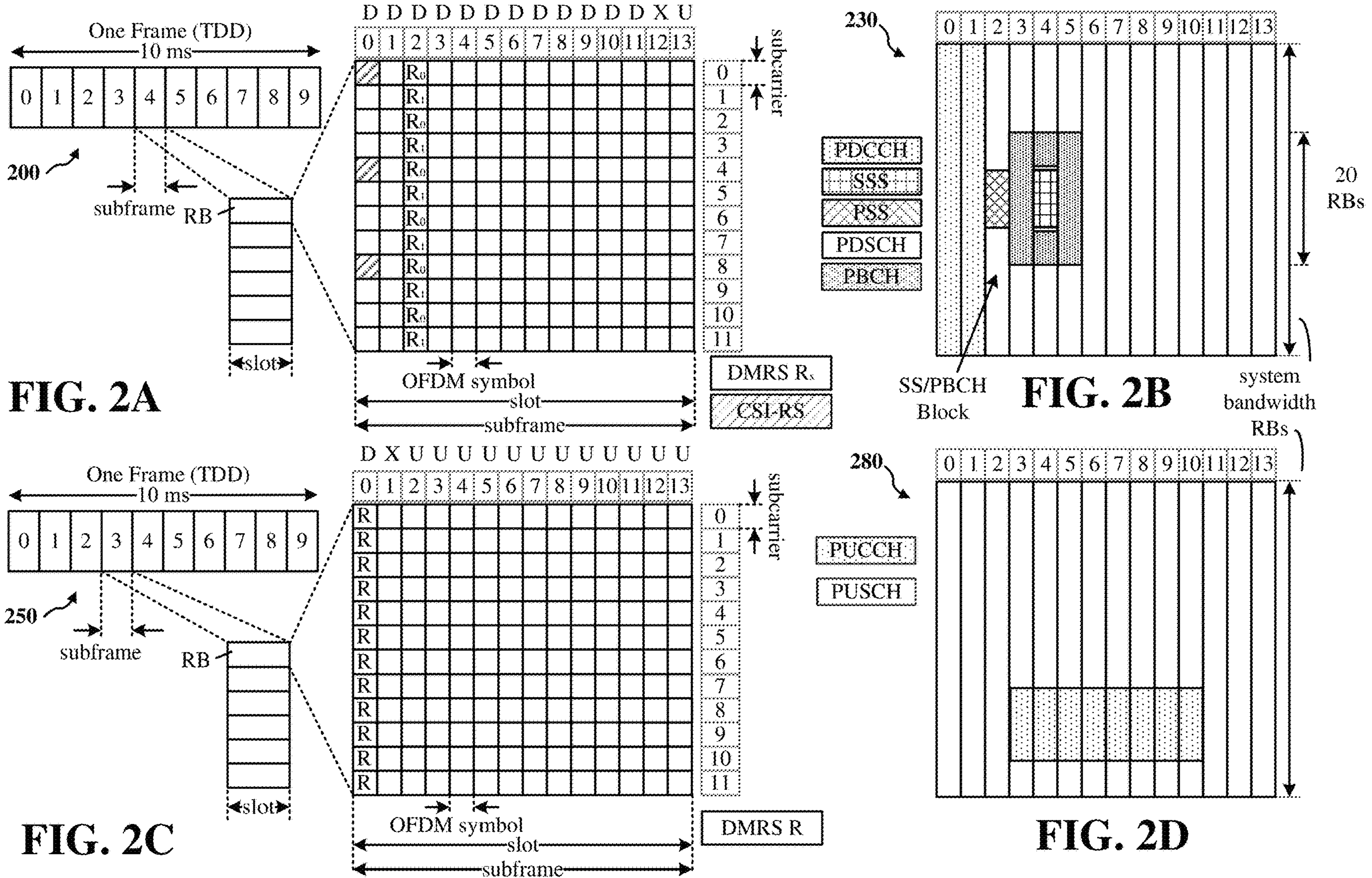
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
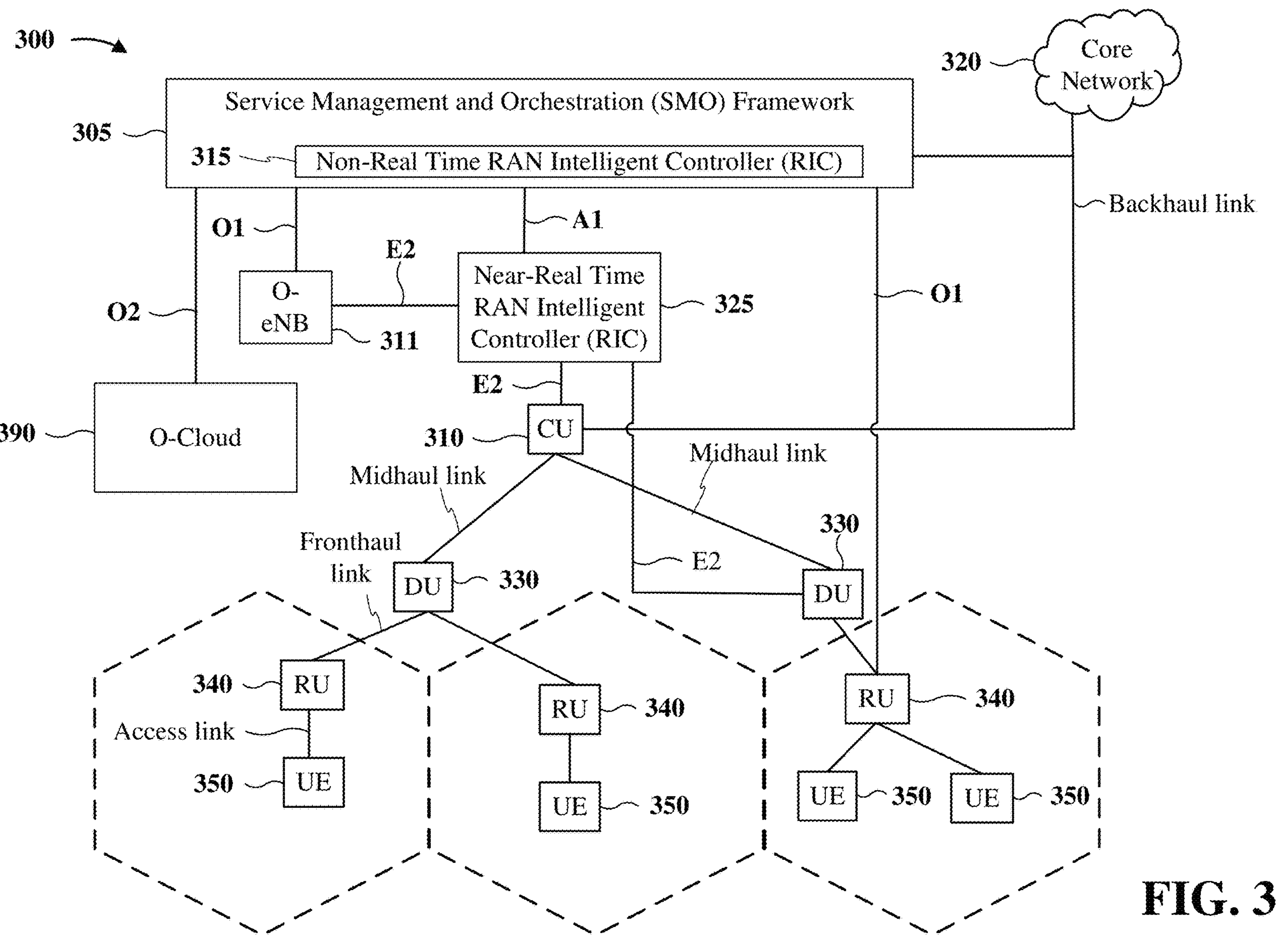
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E3 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O3 interface). Such virtualized network elements can include, but are not limited to, CUs 310, DUs 330, RUS 340 and Near-RT RICs 325. In some implementations, the SMO Framework 305 can communicate with a hardware aspect of a 5G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E3 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Beamforming is a signal processing technique that may be used at the transmitter and/or receiver to shape or steer an antenna beam (e.g., a transmit beam or receive beam) along a spatial path between the transmitter and the receiver. A network entity (e.g., gNB) may generally be capable of communicating with UEs using transmit beams (e.g., downlink transmit beams) of varying beam widths. The UE may further be configured to utilize one or more downlink receive beams to receive signals from the network entity.

Generally speaking, two signals transmitted from the same antenna port should experience the same radio channel, whereas transmitting signals from two different antenna ports should experience different radio conditions. In some cases, transmitted signals from two different antenna ports experience radio channels having common properties. In such cases, the antenna ports are said to be in quasi-colocation (QCL). Two antenna ports may be considered quasi co-located if properties of the channel over which a symbol on one antenna port is conveyed can be inferred from the channel over which a symbol on the other antenna port is conveyed. In 5G NR and later generations, UE are equipped with channel estimation, frequency offset error estimation and synchronization procedures for processing QCL. For example, if the UE knows that the radio channels corresponding to two different antenna ports are QCL in terms of Doppler shift, then the UE can determine the Doppler shift for one antenna port and then apply the result on both antenna ports for channel estimation. This avoids the UE having to calculate Doppler shift for both antenna ports separately.

Four types of QCL are defined in 5G NR: QCL-TypeA; QCL-TypeB; QCL-TypeC; and QCL-TypeD. For example, QCL-TypeA may indicate a downlink reference signal (e.g., SSB or CSI-RS) or uplink reference signal (e.g., SRS) from which the large-scale channel properties (LSCPs), such as Doppler shift, Doppler spread, average delay, and/or delay spread, of a downlink channel or signal or uplink channel or signal may be inferred. QCL-TypeB and QCL-TypeC may also indicate reference signals (e.g., SSB, CSI-RS, or SRS) from which specific LSPCPs (e.g., Doppler shift and/or Doppler spread for QCL-TypeB and average delay and/or delay spread for QCL-TypeC) may be inferred. QCL-TypeD may indicate a spatial RX parameter (e.g., spatial property of the beam on which a downlink/uplink channel or signal is transmitted). The spatial property of the beam may be inferred from the beam utilized for transmission of a reference signal (e.g., SSB, CSI-RS, or SRS) and may indicate, for example, at least one of a beam direction or a beam width.

QCL information may be conveyed via transmission configuration indicator (TCI) states. A TCI state includes or maps to QCL relationship configurations between one or more reference signals (e.g., SSB, CSI-RS, and SRS) and downlink (DL) or uplink (UL) transmissions. For example, a TCI state may include a DL TCI for only downlink transmissions, a joint DL/UL TCI for both downlink and uplink transmissions, or an uplink TCI or spatial relation information for only UL transmissions. For example, the TCI state can include one or more reference signal identifiers (ID) s, each identifying an SSB resource, a CSI-RS resource, or an SRS resource. Each resource (SSB, CSI-RS, or SRS resource) indicates the particular beam, frequency resource, and OFDM symbol on which the corresponding reference signal is communicated. Thus, in examples in which the TCI state indicates QCL-TypeD for a downlink or uplink transmission, the reference signal ID may be utilized to identify the beam to be used for the downlink or uplink transmission based on the QCL relationship with an associated reference signal (e.g., SSB, CSI-RS, or SRS) indicated in the TCI state.

Figure 4:
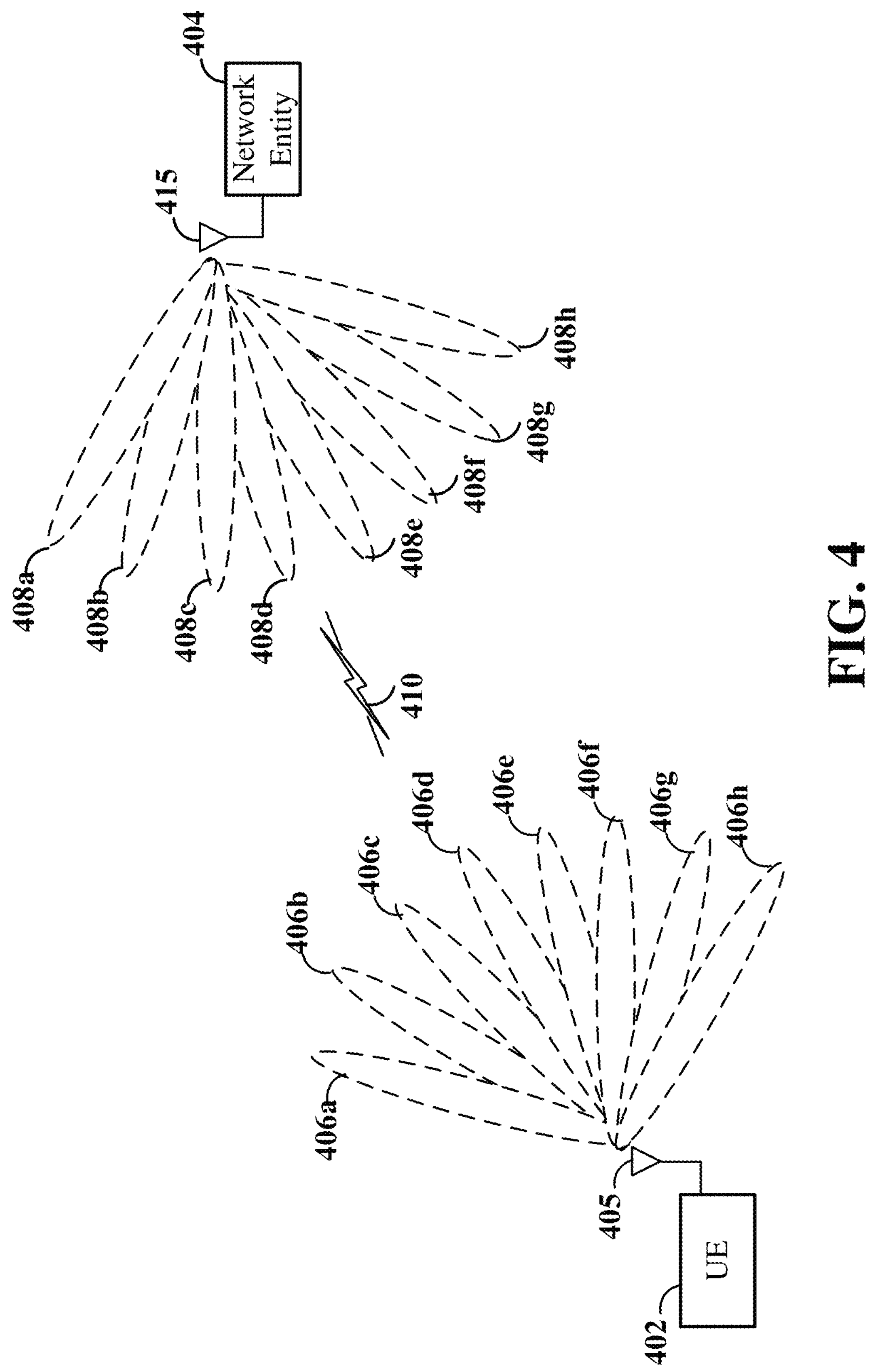
FIG. 4 illustrates an example of a wireless communication system supporting beamforming between a network entity and a UE device according to some aspects.

FIG. 4 is a diagram illustrating communication between a network entity 404 and a UE 402 using beamformed signals according to some aspects. The network entity 404 may be any of the network entities (e.g., gNBs) or NTN entities illustrated in FIGS. 1 and/or 2, and the UE 402 may be any of the UEs illustrated in FIGS. 1 and/or 2.

In the example shown in FIG. 4, the network entity 404 is configured to generate a plurality of beams **408*a*-408*h*, each associated with a different beam direction. In addition, the UE 402 is configured to generate a plurality of beams 406*a*-406*h*, each associated with a different beam direction. The network entity 404 and UE 402 may select one or more beams 408*a*-408*h* on the network entity 404 and one or more beams 406*a*-406*h* on the UE 402** for communication of uplink and downlink signals therebetween using a downlink beam management scheme and/or an uplink beam management scheme.

Beamforming may be achieved by combining the signals communicated via, for example, antennas 405 or 415 (e.g., antenna elements of an antenna array) such that some of the signals experience constructive interference while others experience destructive interference. To create the desired constructive/destructive interference, the UE 402 or network entity 404 may apply amplitude and/or phase offsets to signals transmitted or received from the antenna elements 405 or 415 associated with the UE 402 or network entity 404. In some examples, the antenna elements may be mapped to antenna ports for generation of beams. Here, the term antenna port refers to a logical port (e.g., a beam) over which a signal (e.g., a data stream or layer) may be transmitted. In an example of a base station, an antenna array may include 128 antenna elements (e.g., within a 16×8 array) that may be mapped to 32 antenna ports by an 8×1 combiner.

In an example of a downlink beam management scheme for selection of downlink beams, the network entity 404 may be configured to sweep or transmit on each of a plurality of downlink transmit beams **408*a*-408*h* during one or more synchronization slots. For example, the network entity 404 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 408*a*-408*h* transmitted during a same symbol may not be adjacent to one another. In some examples, the network entity 404** may transmit more or less beams distributed in all directions (e.g., 360 degrees).

In addition, the UE 402 is configured to receive the downlink beam reference signals on a plurality of downlink receive beams 406*a*-406*h*. In some examples, the UE 402 searches for and identifies each of the downlink transmit beams 408*a*-408*h* based on the beam reference signals. The UE 402 then performs beam measurements (e.g., RSRP, SINR, reference signal received quality (RSRQ), etc.) on the beam reference signals on each of the downlink receive beams 406*a*-406*h* to determine the respective beam quality of each of the downlink transmit beams 408*a*-408*h* as measured on each of the downlink receive beams 406*a*-406*h*.

The UE 402 can generate and transmit an L1 measurement report, including the respective beam index (beam identifier (ID)) and beam measurement of one or more of the downlink transmit beam 408*a*-408*h* on one or more of the downlink receive beams 406*a*-406*h* to the network entity 404. The network entity 404 may then select one or more downlink transmit beams on which to transmit unicast downlink control information and/or user data traffic to the UE 402. In some examples, the selected downlink transmit beam(s) have the highest gain from the beam measurement report. In some examples, the UE 402 can further identify the downlink transmit beams selected by the network entity from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The network entity 404 or the UE 402 may further select a corresponding downlink receive beam on the UE 402 for each selected serving downlink transmit beam to form a respective downlink beam pair link (BPL) for each selected serving downlink transmit beam. For example, the UE 402 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 408*d*) on the network entity 404 and a single downlink receive beam (e.g., beam 406*d*) on the UE may form a single downlink BPL used for communication between the network entity 404 and the UE 402. In another example, multiple downlink transmit beams (e.g., beams 408*c*, 408*d*, and 408*c*) on the network entity 404 and a single downlink receive beam (e.g., beam 406*d*) on the UE 402 may form respective downlink BPLs used for communication between the network entity 404 and the UE 402. In another example, multiple downlink transmit beams (e.g., beams 408*c*, 408*d*, and 408*c*) on the network entity 404 and multiple downlink receive beams (e.g., beams 406*d* and 406*c*) on the UE 402 may form multiple downlink BPLs used for communication between the network entity 404 and the UE 402. In this example, a first downlink BPL may include downlink transmit beam 408*c* and downlink receive beam 406*d*, a second downlink BPL may include downlink transmit beam 408*d* and downlink receive beam 406*d*, and a third downlink BPL may include downlink transmit beam 408*e* and downlink receive beam 406*c*.

When the channel is reciprocal, the above-described downlink beam management scheme may also be used to select one or more uplink BPLs for uplink communication from the UE 402 to the network entity 404. For example, the downlink BPL formed of beams 406*d* and 408*d* may also serve as an uplink BPL. Here, beam 406*d* is utilized as an uplink transmit beam, while beam 408*d* is utilized as an uplink receive beam.

In an example of an uplink beam management scheme, the UE 402 may be configured to sweep or transmit on each of a plurality of uplink transmit beams 406*a*-406*h*. For example, the UE 402 may transmit an SRS on each beam in the different beam directions. In addition, the network entity 404 may be configured to receive the uplink beam reference signals on a plurality of uplink receive beams 408*a*-408*h*. In some examples, the network entity 404 searches for and identifies each of the uplink transmit beams 406*a*-406*h* based on the beam reference signals. The network entity 404 then performs beam measurements (e.g., RSRP, SINR, RSRQ, etc.) on the beam reference signals on each of the uplink receive beams 408*a*-408*h* to determine the respective beam quality of each of the uplink transmit beams 406*a*-406*h* as measured on each of the uplink receive beams 408*a*-408*h*.

The network entity 404 may then select one or more uplink transmit beams on which the UE 402 will transmit unicast downlink control information and/or user data traffic to the network entity 404. In some examples, the selected uplink transmit beam(s) have the highest gain. The network entity 404 may further select a corresponding uplink receive beam on the network entity 404 for each selected serving uplink transmit beam to form a respective uplink beam pair link (BPL) for each selected serving uplink transmit beam. For example, the network entity 404 can utilize the uplink beam measurements to select the corresponding uplink receive beam for each serving uplink transmit beam. In some examples, the selected uplink receive beam to pair with a particular uplink transmit beam may have the highest gain for that particular uplink transmit beam.

The network entity 404 may then notify the UE 402 of the selected uplink transmit beams. For example, the network entity 404 may provide the SRS resource identifiers (SRIs) identifying the SRSs transmitted on the selected uplink transmit beams. In some examples, the network entity 404 may apply each selected uplink transmit beam (and corresponding uplink receive beam) to an uplink signal (e.g., PUCCH, PUSCH, etc.) and transmit the respective SRIs associated with the selected uplink transmit beams applied to each uplink signal to the UE 402. When the channel is reciprocal, the above-described uplink beam management scheme may also be used to select one or more downlink BPLs for downlink communication from the network entity 404 to the UE 402. For example, the uplink BPLs may also be utilized as downlink BPLs.

Figure 5:
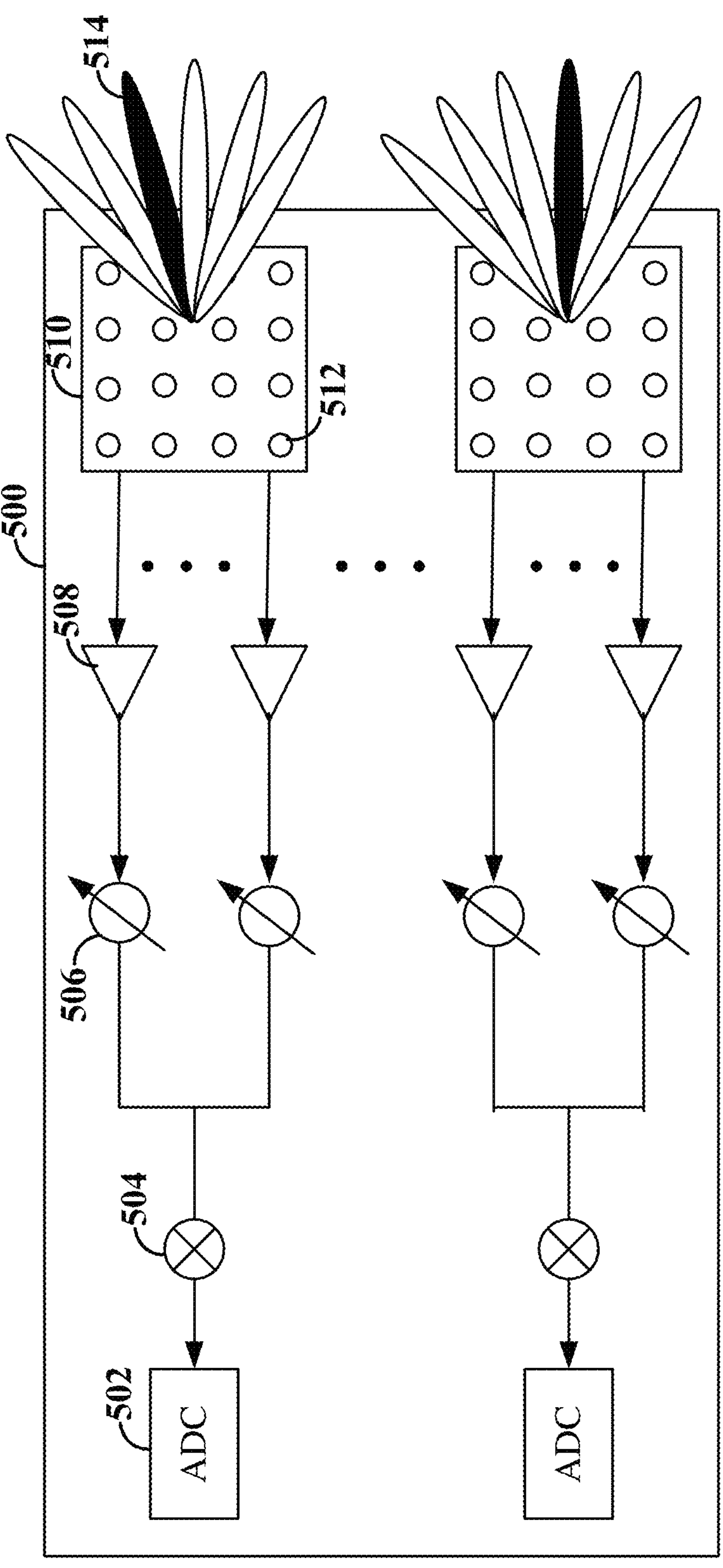
FIG. 5 is a diagram illustrating an example of a transmitter architecture for beamforming according to some aspects.

FIG. 5 is a diagram illustrating an example of a receiver architecture 500 for beamforming according to some aspects. The receiver architecture 500 may include, for example, one or more antenna modules (arrays) 510, each including a plurality of antenna elements for receiving respective radio frequency (RF) signals, which may be amplified by respective low noise amplifiers 508 to produce respective amplified RF signals. The amplified RF signals may be input to respective analog phase-shifters 506 to extract a respective analog beamformed signal corresponding to a desired beam 514 from each of the antenna modules 510. In other examples, digital phase-shifters may be utilized to extract the beamformed signals in the digital domain. The resulting analog beamformed signals may be down-converted to an intermediate frequency (IF) or baseband (BB) frequency by respective mixers 504. In other examples, the signals may be down-converted in the digital domain. The down-converted analog signals may then be input to analog-to-digital converters (ADCs) 502, each configured to convert the respective down-converted analog signal to a respective digital signal.

FIG. 6 is a diagram illustrating an example of a wireless communication device 600 including a plurality of antenna modules 602 and 604 (e.g., antenna arrays) according to some aspects. The wireless communication device 600 may correspond to any of the UEs or other suitable devices illustrated in FIGS. 1, 3 and/or 4. In addition, the wireless communication device 600 may be a 5G wireless communication device configured to transmit and receive mmWave frequencies using antenna modules 602 and 604. Although two antenna modules 602 and 604 are illustrated in FIG. 6, it should be understood that the wireless communication device 600 may include any number of antenna modules.

Each antenna module (e.g., antenna module 602) may be capable of emitting or receiving energy in the form of a plurality of beams 606*a* and 606*b* to cover a part of the sphere 610 surrounding the respective antenna module 604. Each of the beams 606*a* and 606*b* may be directed towards a different portion of a coverage area (e.g., of the sphere 610) of the respective antenna module 602. In the example shown in FIG. 6, the antenna module 602 is configured to generate or receive beams 606*a* and 606*b* within an in-coverage region 612 of the antenna array. The in-coverage region 612 includes a boresight direction 608 of the antenna module 602 and a neighborhood of the boresight direction 608 of the antenna module 602. A simple illustration of a neighborhood includes the regions that are within +/−M degrees in both elevation (θ) and azimuth (φ) from the boresight direction 608, where M is less than 180 degrees and is configured or chosen appropriately. Typically, at millimeter wave carrier frequencies, M is chosen to be 30 to 45 degrees since the antenna elements are directional by design. In the example shown in FIG. 6, the antenna module 602 has a boresight direction 608 along the X-axis (with an elevation angle (θ)=90° and azimuth angle (φ)=0°). Similarly, the antenna module 604 has a boresight direction along the Y-axis (θ=90° and φ=0°).

The number of beams 606*a* and 606*b* generated/received per antenna module 602 and 604 may depend, for example, on the number of antenna subarrays and the number of antenna elements in each subarray of each antenna module 602 and 604. In general, to meet link budget requirements for downlink transmissions (e.g., from the gNB to the wireless communication device 600), each antenna module 602 and 604 may support N beams per N antenna element subarrays in the module. Such a design ensures that the cross-over point between adjacently steered beams is approximately 4 dB below the peak of the main lobe. For example, assuming that there is one antenna subarray per antenna module 602 and 604, the wireless communication device 600 shown in FIG. 6 may support N beams per antenna module and 2N beams in total. If N=5, as shown in the example of FIG. 6, the wireless communication device 600 may support 10 total beams (e.g., five beams from each antenna module 602 and 604). However, it should be understood that each antenna module 602 and 604 may support any suitable numbers of beams and this is a design parameter/metric capturing the performance-latency tradeoffs.

In many UE implementations, for lower cost or lower power consumption, antenna modules may be equipped with smaller-sized antenna arrays (e.g., 1×4 or 1×3 antenna arrays). To improve spherical coverage performance, beamformed signals across multiple antenna modules (or antenna module sections) may be combined together at the radio frequency (RF), intermediate frequency (IF), or baseband (BB) levels.

Figure 7B:
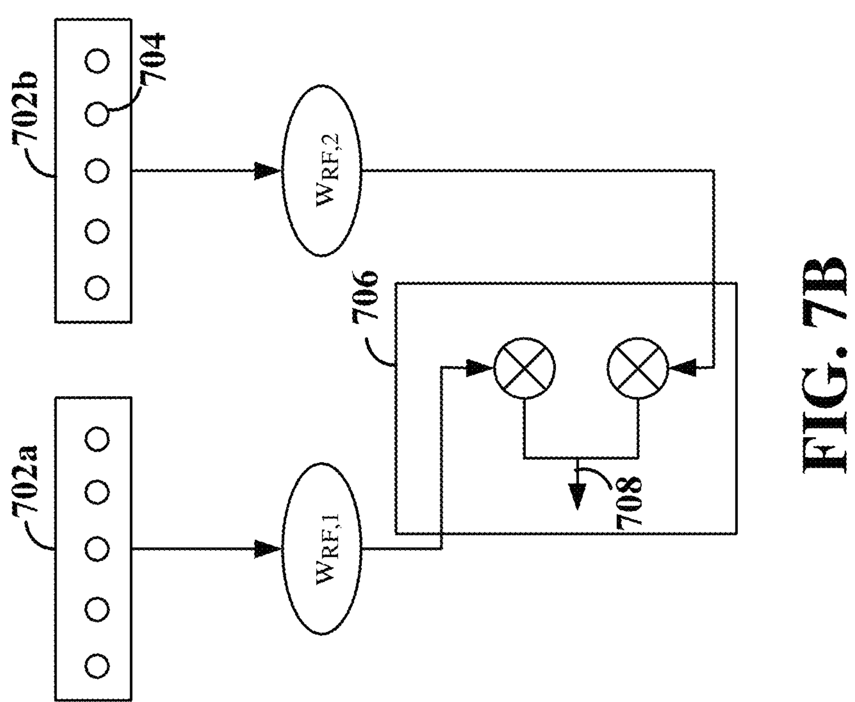
FIGS. 7A and 7B are diagrams illustrating examples of radio frequency (RF) beam combining and intermediate frequency (IF)/baseband (BB) beam combining according to some aspects.
Figure 7A:
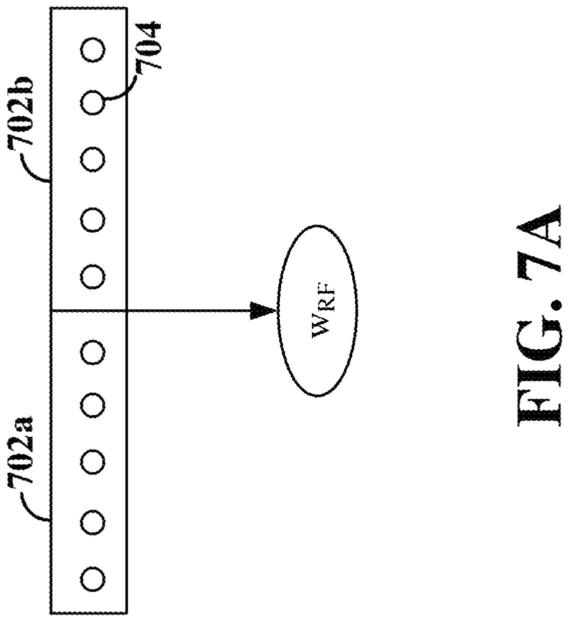

FIGS. 7A and 7B are diagrams illustrating examples of radio frequency (RF) beam combining and intermediate frequency (IF)/baseband (BB) beam combining according to some aspects. In the examples shown in FIGS. 7A and 7B, a UE includes two antenna modules 702*a* and 702*b*, each having a 1×5 antenna array corresponding to five antenna elements 704. FIG. 7A illustrates an example of RF combining, in which the signals received across each of the antenna modules 702*a* and 702*b* are combined at the RF level (e.g., via an RF integrated circuit (RFIC) chip) to produce an RF-combined beamformed signal $w_{RF}$. At the RF level, the RF-combined beamformed signal $w_{RF}$ is produced by selection of appropriate beam weights for each of the antenna elements 704. The beam weights determine the phases of each of the antenna elements 704 such that the signals received at each of the antenna elements coherently combine to maximize the signal strength along a certain direction (e.g., a beam). For example, in RF combining, the RF-combined beamformed signal $w_{RF}$ may be represented as:

$$w_{RF} = [\omega_1, \omega_2 \ldots \omega_{10}]$$

with $$|\omega_i| \leq \omega,$$

where $\omega_i$ is the phase of the corresponding antenna element. RF beamforming can be performed with static/non-adaptive directional beams (static beam weights) or dynamic/adaptive beam weights.

FIG. 7B illustrates an example of IF/BB combining, in which the signals received across each of the antenna modules 702*a* and 702*b* are combined at the IF/BB level (e.g., via an IF integrated circuit (IFIC) chip or a BB modem) to produce an IF/BB-combined beamformed signal 708. At the IF/BB level, each of the antenna modules 702*a* and 702*b* may produce a respective post-RF beamformed signal $w_{RF,1}$ and $w_{RF,2}$. For example, the post-RF beamformed signals may be represented as:

$$w_{RF,1} = [\omega_1, \omega_2 \ldots \omega_5]$$

with $$|\omega_i| \leq \omega,$$

$$w_{RF,2} = [\omega_6, \omega_7 \ldots \omega_{10}]$$

with $$|\omega_i| \leq \omega,$$

where $\omega_i$ is the phase of the corresponding antenna element.

Each of the post-RF beamformed signals $w_{RF,1}$ and $w_{RF,2}$ may be combined at the IFIC/BB chip 706 to produce the IF/BB-combined beamformed signal 708. At the IF/BB level, both amplitude and phase control may be applied to the post-RF beamformed signals $w_{RF,1}$ and $w_{RF,2}$ to produce the IF/BB-combined beamformed signal 708. The additional amplitude control at the IF/BB level allows for finer control of the combined beamformed signal. For example, the amplitude of the post-RF beamformed signal $w_{RF,1}$ Or $w_{RF,2}$ of one or the other antenna modules 702*a* or 702*b* may be set to zero to cancel the signal from one of the antenna modules 702*a* or 702*b*. Similarly, the amplitude of one of the post-RF beamformed signals (e.g., $w_{RF,1}$) may be set higher than the amplitude of the other post-RF beamformed signal (e.g., $w_{RF,2}$). Thus, there is a $B_1$ bit control for phase at the RF-level, along with both a $B_2$ bit control for phase and a $B_3$ bit control for amplitude (e.g., non-uniform quantization control) at the IF/BB-level.

The type of beam combining (RF, IF/BB) that may be implemented by the UE may depend on the beamforming architecture of the UE. The beamforming architecture specifies the configuration of antenna modules, RFIC chip(s), and IFIC/BB chips on the UE.

Figures 8A, 8B, 8C:
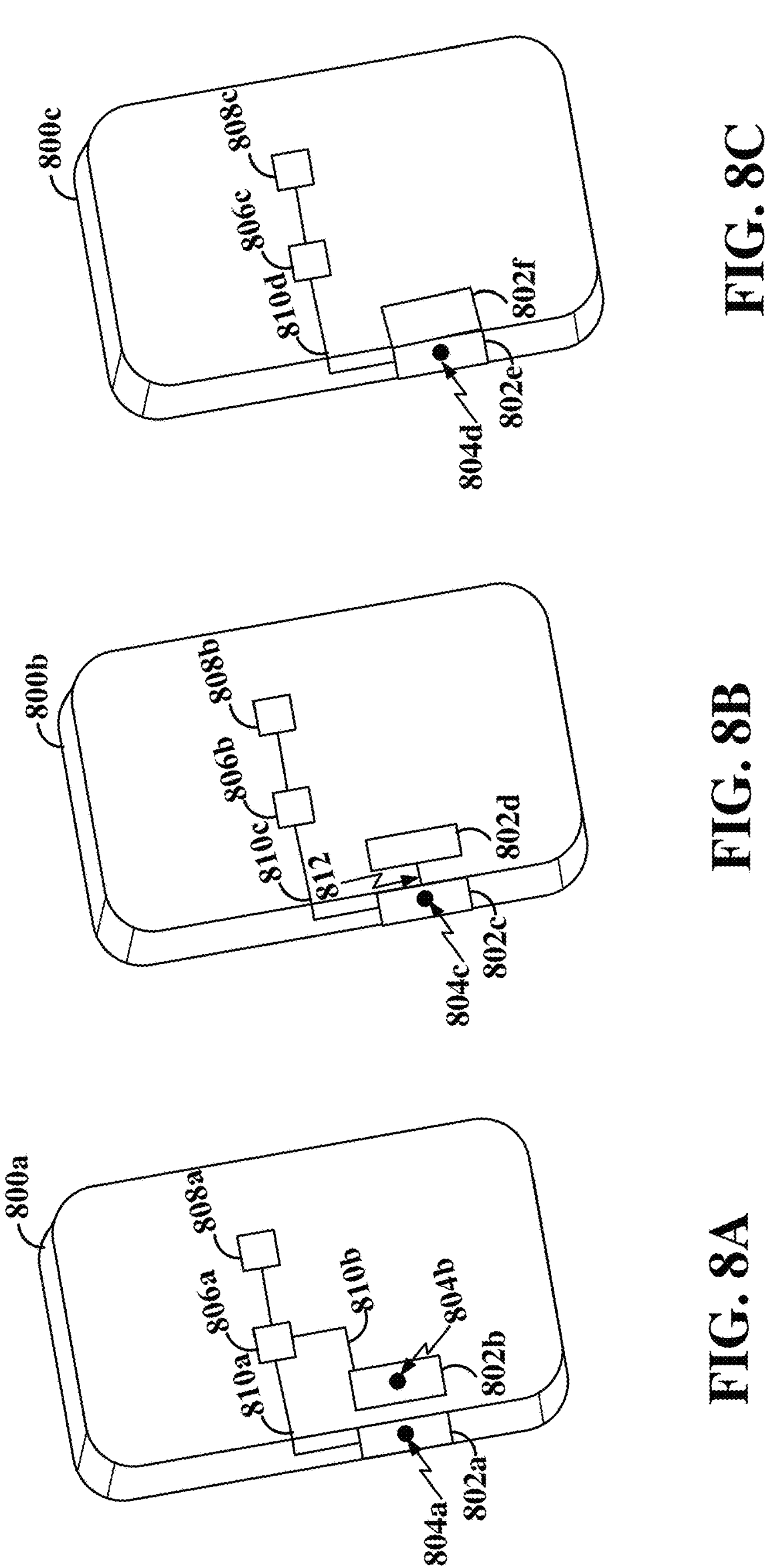
FIGS. 8A, 8B and 8C are diagrams illustrating examples of beamforming architectures according to some aspects.

FIGS. 8A, 8B and 8C are diagrams illustrating examples of beamforming architectures according to some aspects. In the example shown in FIG. 8A, a UE 800*a* includes two independent antenna modules 802*a* and 802*b*, each controlled by a respective radio frequency (RF) integrated circuit (RFIC) chip 804*a* and 804*b*. Each antenna module 802*a* and 802*b* is located on a different respective side of the UE 800*a*. The RFIC chips 804*a* and 804*b* are each connected to a single intermediate frequency (IF) integrated circuit (IFIC) chip 806*a* via respective IFIC connectors 810*a* and 810*b*. The IFIC chip 806*a* is further connected to a baseband (BB) chip 808*a*. In other examples, each RFIC chip 804*a* and 804*b* may be coupled to a separate respective IFIC chip, which may then each be coupled to the BB chip 808*a*. In still other examples, each RFIC chip 804*a* and 804*b* may be coupled to a separate respective IFIC chip, which may then each be coupled to a separate respective BB chip.

In the example shown in FIG. 8B, the UE 800*b* includes a distributed antenna module including two antenna module sections 802*c* and 802*d*, both of which are controlled by a single RFIC chip 804*c*. Each antenna module section 802*c* and 802*d* is located on a different respective side of the UE 800*b*. The antenna module sections 802*c* and 802*d* are coupled via an RF connector 812. The RFIC chip 804*c* is connected to a single IFIC chip 806*b* via a single IFIC connector 810*c*. The IFIC chip 806*c* is further connected to a BB chip 808*b*.

In the example shown in FIG. 8C, the UE 800*c* includes a co-located antenna module including two antenna module sections 802*e* and 802*f* positioned on different, connecting sides of the UE 800*c*. The antenna module sections 802*e* and 802*f* are controlled by a single RFIC chip 804*d*, which is further coupled via an IFIC connector 810*d* to a single IFIC chip 806*d*. The IFIC chip 806*d* is further connected to a BB chip 808*d*.

In the example shown in FIG. 8A, IF/BB beam combining may be utilized to combine the received beamformed signals from each of the antenna modules 802*a* and 802*b* to improve the spherical coverage of the UE 800*a*. In the example shown in FIG. 8A, either RF combining or IF/BB combining may be utilized. In some examples, the RF connector 812 may lead to moderate-to-high feedline losses depending on the separation between the two antenna module sections (parts) 802*c* and 802*c*. In this case, IF/BB combining may be selected in the beamforming architecture shown in FIG. 8B due to the increased feedline losses resulting from the RF connector 812. In the example shown in FIG. 8C, either RF combining or IF/BB combining may be utilized. In some examples, RF combining may be selected in the beamforming architecture shown in FIG. 8C due to the lower feedline losses as compared to the beamforming architecture shown in FIG. 8B.

The beamforming combining type (e.g., RF, IF, or BB) implemented at a UE may therefore depend on various UE factors, including the beamforming architecture of the UE. FIG. 9 is a diagram illustrating exemplary UE factors 902 for selection of a beam combining type 904 according to some aspects. As shown in FIG. 9, UE factors 902 can include one or more of the number of RFICs (RFIC chips) on the UE, the number of RF chains (e.g., RFIC through BB) on the UE, the antenna module configuration (e.g., beamforming architecture), the feedline losses between antenna modules, the cost of RF or IF/BB combining, the diversity to hand blockage of the antenna module configuration, the performance gains of the antenna module configuration, the amplitude and phase control options per beam combining type, the thermal overhead of the UE, and/or the power consumption of the UE.

For example, RF combining may be used if the number of RFICs is one, whereas IF combining or BB combining may be used if the number of RFICs is greater than one. Similarly, RF combining or IF combining may be used if the number of RF chains per polarization is one, whereas BB combining may be used if the number of RF chains per polarization is greater than one. In addition, RF combining may support multiple co-located or non-colocated sides (sections or parts) of an antenna module, whereas IF combining or BB combining may support any separation between antenna modules or antenna module sections. Furthermore, if the separation between antenna module sections increases, the feedline losses increase for RF combining, whereas the feedline loss impact to IF/BB combining may be minimal regardless of the separation. For example, for a 5 cm length RF connector, feedline losses of 4 or 5 dB may be expected in RF combining.

Moreover, although the cost may be increased in RF combining with a single RFIC chip due to the flex design for the single RFIC chip, IF/BB combining may also see an increased cost due to the use of multiple RFIC chips and multiple RF/IF connectors. RF combining may further experience a reduced diversity to hand blockage since multiple co-located sides (sections) may be blocked simultaneously as compared to IF/BB combining where antenna modules/sections can be independently located (positioned apart from one another).

As described above, RF combining provides for only limited or no amplitude control with typically less than or equal to 5-bit phase control. By contrast, IF/BB combining allows for amplitude control in the form of receive (Rx) fine gain control for IF or Rx outer loop automatic gain control (AGC) for BB. In addition, with RF combining, the thermal overhead of the UE is higher than for IF/BB combining. For example, in beamforming architectures with co-located or distributed antenna module designs, the thermal overhead may be higher as compared to a beamforming architecture in which the antenna modules are separated by a greater distance. Furthermore, the power consumption of the UE is comparable at the RF level for RF/IF/BB combining, but higher at the BB level for IF/BB combining than for RF combining.

Figure 10:
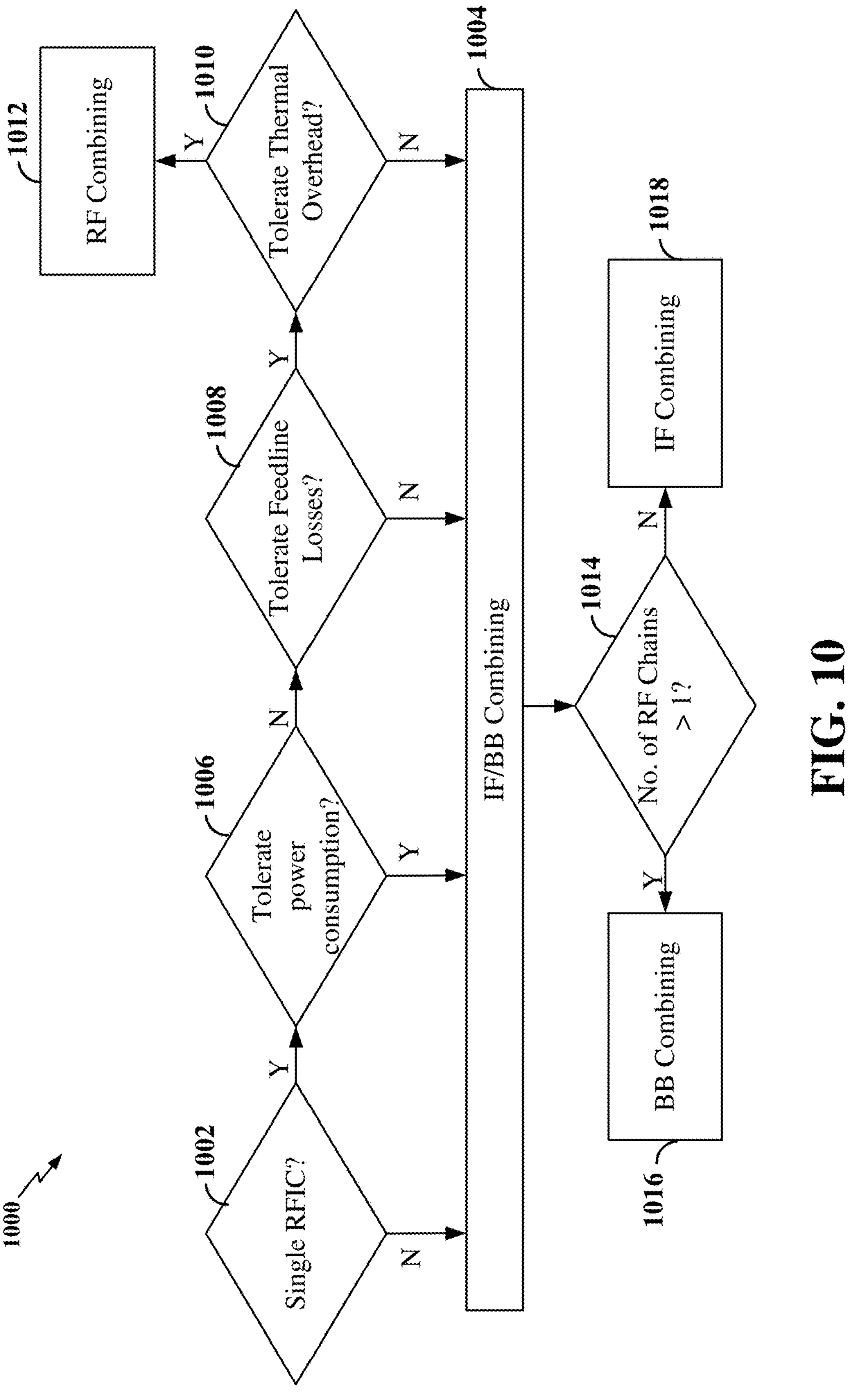
FIG. 10 is a flow chart illustrating an exemplary process for selecting a beam combining type according to some aspects.

FIG. 10 is a flow chart illustrating an exemplary process 1000 for selecting a beam combining type according to some aspects. As described below, some or all illustrated features may be omitted in a particular implementation within the scope of the present disclosure, and some illustrated features may not be required for implementation of all embodiments. In some examples, the process 1000 may be carried out by the UE 1600 illustrated in FIG. 16. In some examples, the process 1000 may be carried out by any suitable apparatus or means for carrying out the functions or algorithm described below.

The process begins at block 1002, where the UE determines whether the UE includes a single RFIC chip or multiple RFIC chips. If the UE includes multiple RFIC chips (N branch of block 1002), the process proceeds to block 1004, where the UE implements either IF combining or BB combining. At block 1014, the UE determines whether the UE includes or is using a single RF chain or multiple RF chains. If the UE includes or is using more than one RF chain (Y branch of block 1014), the process proceeds to block 1016, where the UE implements BB combining. However, if the UE includes or is using only a single RF chain, the process proceeds to block 1018, where the UE implements IF combining.

If the UE includes a single RFIC chip (Y branch of block 1002), the process proceeds to block 1006, where the UE can tolerate the power consumption for IF/BB combining. For example, the UE may determine a current expected power consumption for IF/BB combining and compare the expected power consumption to a threshold power consumption for IF/BB combining. If the expected power consumption is less than the threshold, the UE can determine that the UE is able to tolerate the expected power consumption (Y branch of block 1006), and the process proceeds to block 1004, where the UE implements either IF combining or BB combining. If the expected power consumption for IF/BB combining is greater than the threshold, the UE can determine that the UE is not able to tolerate the higher power consumption for IF/BB combining (N branch of block 1006), and, the process proceeds to block 1008, where the UE determines whether the UE can tolerate feedline losses for RF combining. For example, the UE may determine the expected feedline losses for RF combining and compare the expected feedline losses with a threshold feedline loss.

If the expected feedline loss is greater than the threshold feedline loss, the UE can determine that the UE is unable to tolerate the feedline loss for RF combining (N branch of block 1008), and the process proceeds to block 1004, where the UE implements IF or BB combining. If the expected feedline loss is less than the threshold feedline loss, the UE can determine that the UE is able to tolerate the feedline loss for RF combining (Y branch of block 1008), and the process proceeds to block 1010, where the UE determines whether the UE can tolerate the thermal overhead for RF combining. For example, the UE may compare the expected thermal overhead for RF combining to a thermal overhead threshold. If the expected thermal overhead for RF combining is less than the threshold, the UE can determine that the UE is able to tolerate the expected thermal overhead (Y branch of block 1010), and the process proceeds to block 1012, where the UE implements RF combining. If the expected thermal overhead for RF combining is greater than the threshold, the UE can determine that the UE is unable to tolerate the expected thermal overhead (N branch of block 1010), and the proceeds to block 1004, where the UE implements IF or BB combining.

Figure 11:
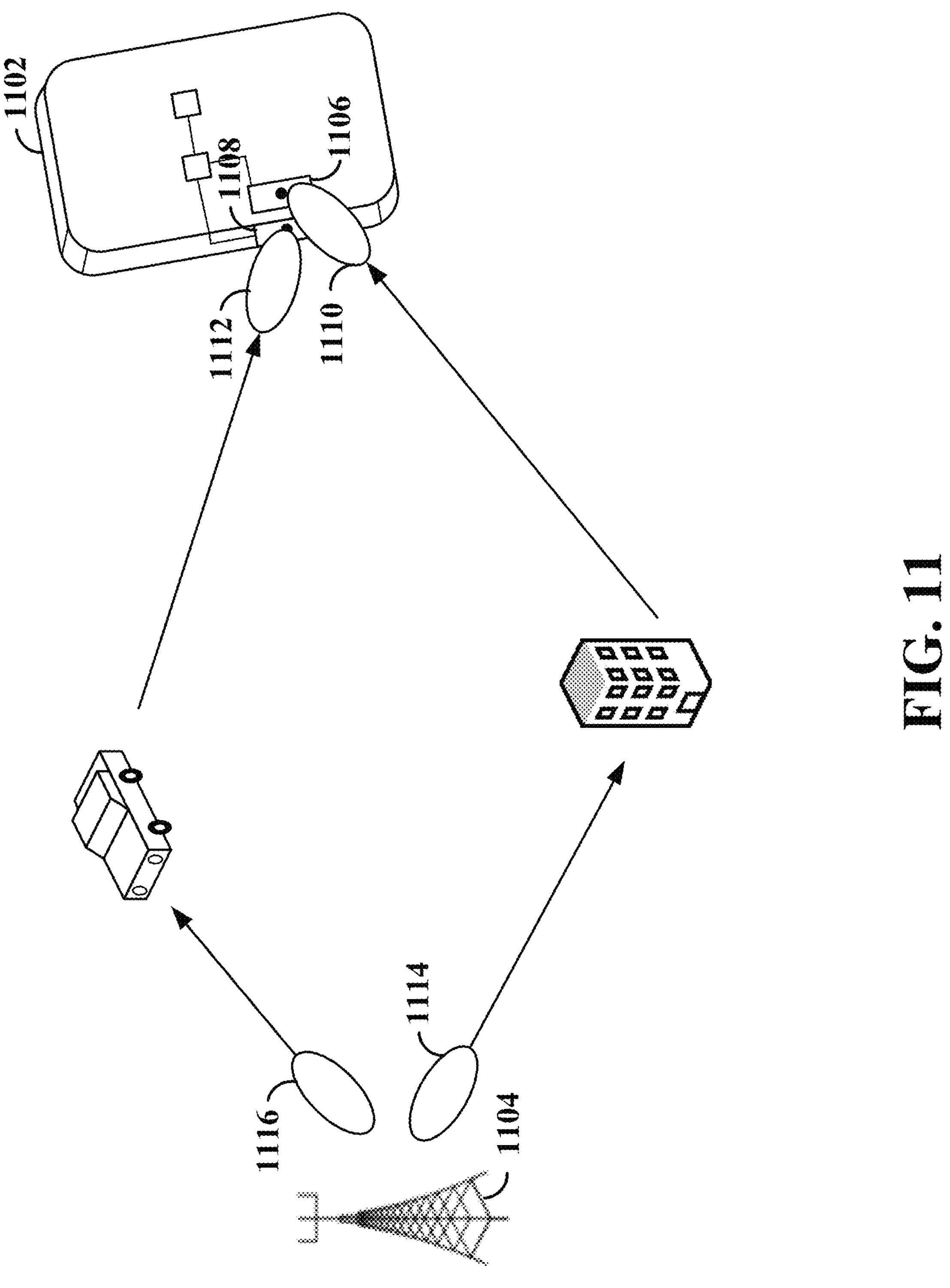
FIG. 11 is a diagram illustrating an example of intermediate frequency (IF)/baseband (BB) beam combining according to some aspects.

FIG. 11 is a diagram illustrating an example of intermediate frequency (IF)/baseband (BB) beam combining according to some aspects. In the example shown in FIG. 11, a UE 1102 and network entity 1104 (e.g., a gNB, one or more TRPs, or other aggregated or disaggregated base station) are configured to transmit and receive mmWave frequencies using respective antenna modules thereon. For example, the UE 1102 may include two independent and separated antenna modules 1106 and 1108, each controlled by a respective RFIC chip. Thus, the UE 1102 may be configured to receive a downlink transmission from the network entity 1104 via two separate receive beams 1110 and 1112 and combine the beamformed signals received via beams 1110 and 1112 at the IF or BB level. To facilitate the beam combining, the network entity 1104 may transmit the downlink transmission on two different transmit beams 1114 and 1116 (e.g., across possibly two different TCI states, as shown in FIG. 11) to enable the energy from the beams 1114 and 1116 to be received at beams 1110 and 1112 and combined at the UE 1102 via IF/BB combining. For example, the network entity 1104 may transmit a downlink transmission using a first beam 1114 with a first TCI state and a second beam 1116 with a second TCI state. Each beam 1114/1116 (e.g., each TCI state) may be selected to produce the highest gain for the corresponding receive beams 1110/1112 on the UE 1102.

Figure 12:
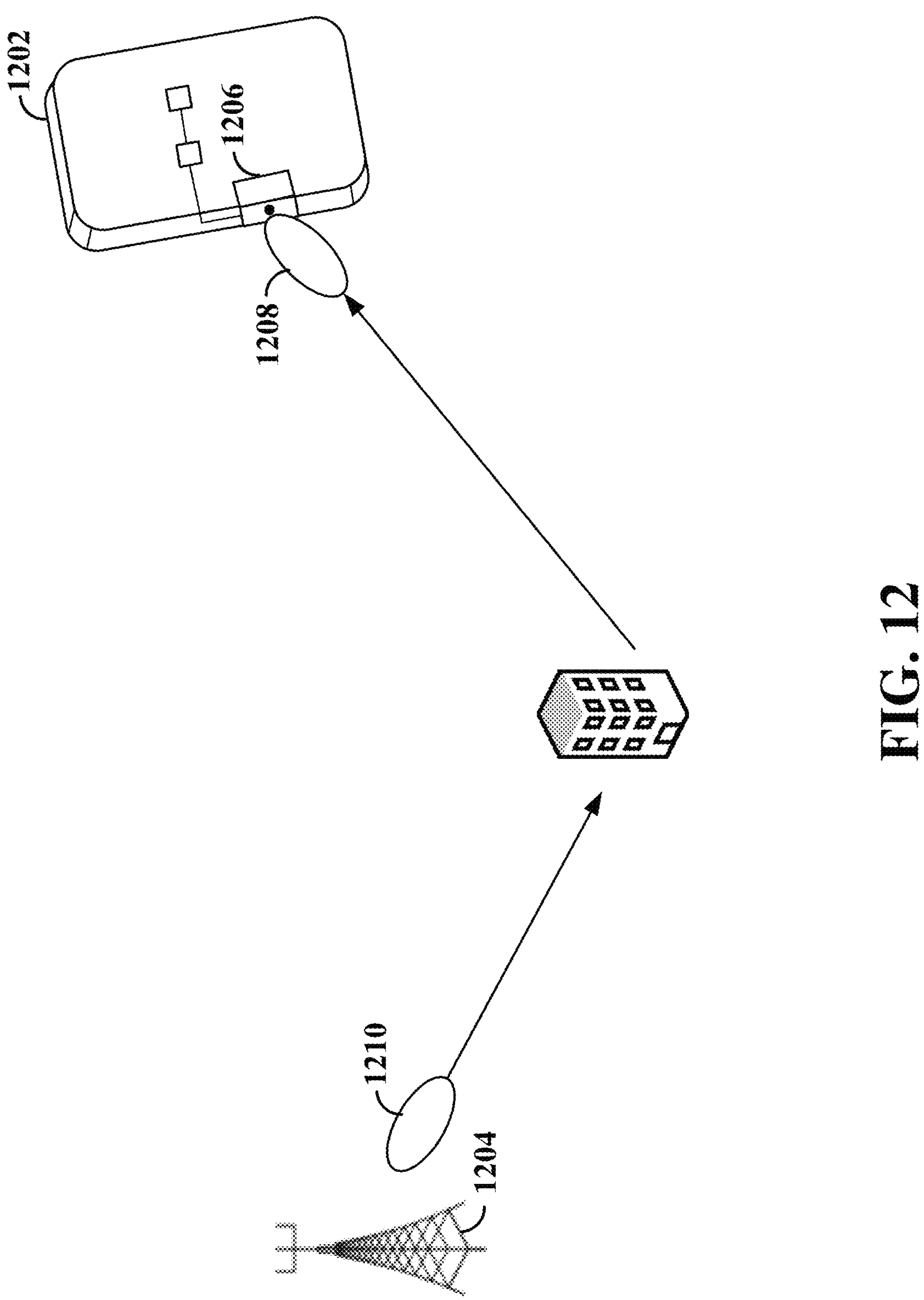
FIG. 12 is a diagram illustrating an example of radio frequency (RF) beam combining according to some aspects.

FIG. 12 is a diagram illustrating an example of radio frequency (RF) beam combining according to some aspects. In the example shown in FIG. 12, a UE 1202 and network entity 1204 (e.g., a gNB, one or more TRPs, or other aggregated or disaggregated base station) are configured to transmit and receive mmWave frequencies using respective antenna modules thereon. For example, the UE 1202 may include a co-located antenna module including two antenna module sections positioned on different, connecting sides of the UE 1202. As shown in FIG. 12, the antenna module sections of the co-located antenna module 1206 are controlled by a single RFIC chip. In this example, a single receive beam 1208 may be sufficient to receive a downlink transmission from the network entity 1204, with RF beam combining of the single receive beam 1208 across the antenna module sections of the co-located antenna module 1206 at the UE being performed to extract the beamformed signal. Thus, the network entity 1204 may transmit the downlink transmission on a single transmit beam 1210 (e.g., via a single TCI state, as shown in FIG. 12) to enable the energy from the transmit beam 1210 to be received at the receive beam 1208 and combined at the UE 1202 via RF combining.

To support various beam combining types at the UE, in various aspects, the UE may further be configured to indicate or recommend one or more TCI states for a gNB (or set of gNBb/TRPs) to utilize for downlink transmissions to the UE to maximize the gains at the UE based on the beam combining type implemented at the UE. For example, the UE may be configured to select a beam combining type and provide TCI state information including one or more recommended TCI states to the network entity based on the selected beam combining type. In other examples, the TCI state information may include different sets of one or more TCI states for different beam combining types (e.g., a first set of TCI state(s) for RF combining, a second set of TCI state(s) for IF combining, and a third set of TCI state(s) for BB combining). The network entity may then select a set of one or more TCI states, and based on the selected TCI state(s), the UE may switch to the beam combining type associated with the selected TCI state(s). In some examples, the UE may further provide a UE capability to the network entity that indicates the various beam combining types supported by the UE.

Figure 13:
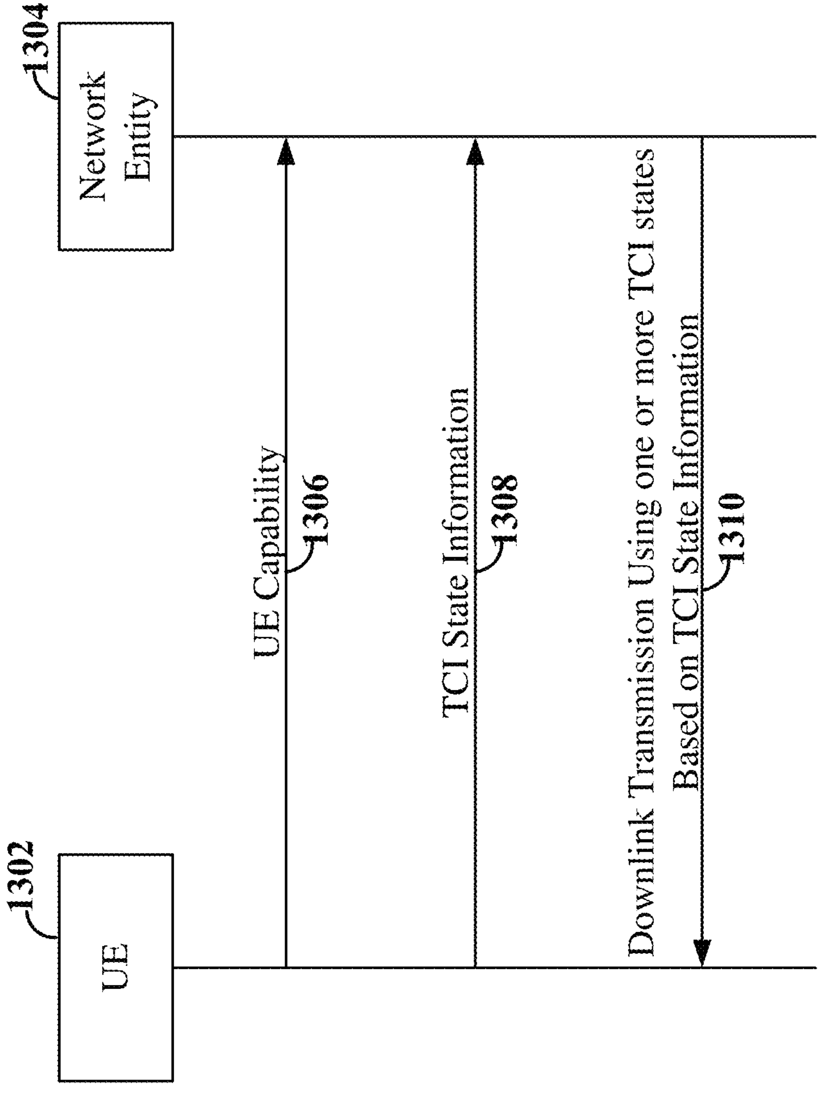
FIG. 13 is a signaling diagram illustrating exemplary signaling for transmission configuration indication (TCI) state selection based on a UE beam combining capability according to some aspects.

FIG. 13 is a signaling diagram illustrating exemplary signaling between a UE 1302 and a network entity 1304 for transmission configuration indication (TCI) state selection based on a UE beam combining capability according to some aspects. The UE 1302 may correspond to any of the UEs or other wireless communication devices shown in any of FIGS. 1, 3-8C, 11 and/or 12. The network entity 1304 may correspond to any of the base stations or other network entities shown in FIGS. 1, 3, 4, 11, and/or 12. For example, the network entity 1304 may correspond to an aggregated base station, an RU, a DU, a CU, a TRP, an IAB node, or other network device.

At 1306, the UE 1302 may optionally transmit a UE capability to the network entity 1304. The UE capability may indicate that the UE supports one or more of RF combining, IF combining, or BB combining of beamformed signals across one or more antenna modules (or antenna module sections) of the UE 1302.

At 1308, the UE 1302 may further transmit TCI state information to the network entity 1304. The TCI state information may include at least one of a single TCI state (e.g., for RF combining) or multiple TCI states (e.g., for IF/BB combining) based on the UE supporting RF, IF, and/or BB combining. Each TCI state included in the TCI state information may be a recommended TCI state for the network entity 1304 to use for downlink transmissions to the UE 1302 based on the beam combining type implemented at the UE 1302. In some examples, the TCI state information may include a single TCI state based on the UE supporting RF combining across an antenna module (e.g., across antenna module sections of a co-located or distributed antenna module) of the UE. In other examples, the TCI state information may include two or more TCI states based on the UE supporting IF combining and/or BB combining across two or more antenna modules or antenna module sections of one or more co-located and/or distributed antenna modules of the UE. In some examples, the TCI state information may include both a single TCI state for RF combining and multiple TCI states for IF/BB combining (e.g., a set of TCI states for IF combining and/or a set of TCI states for BB combining).

At 1310, the network entity 1304 may provide a downlink transmission to the UE 1302 using one or more selected TCI states based on the TCI state information. For example, the network entity may select the one or more selected TCI states from the TCI state information provided by the UE 1302. In an example, the network entity may select a single TCI state from the TCI state information for RF combining at the UE. In other examples, the network entity may select multiple TCI states from the TCI state information for IF/BB combining at the UE. In some examples, the network entity may include the selected TCI state(s) within downlink control information (DCI) scheduling the downlink transmission.

Figure 14:
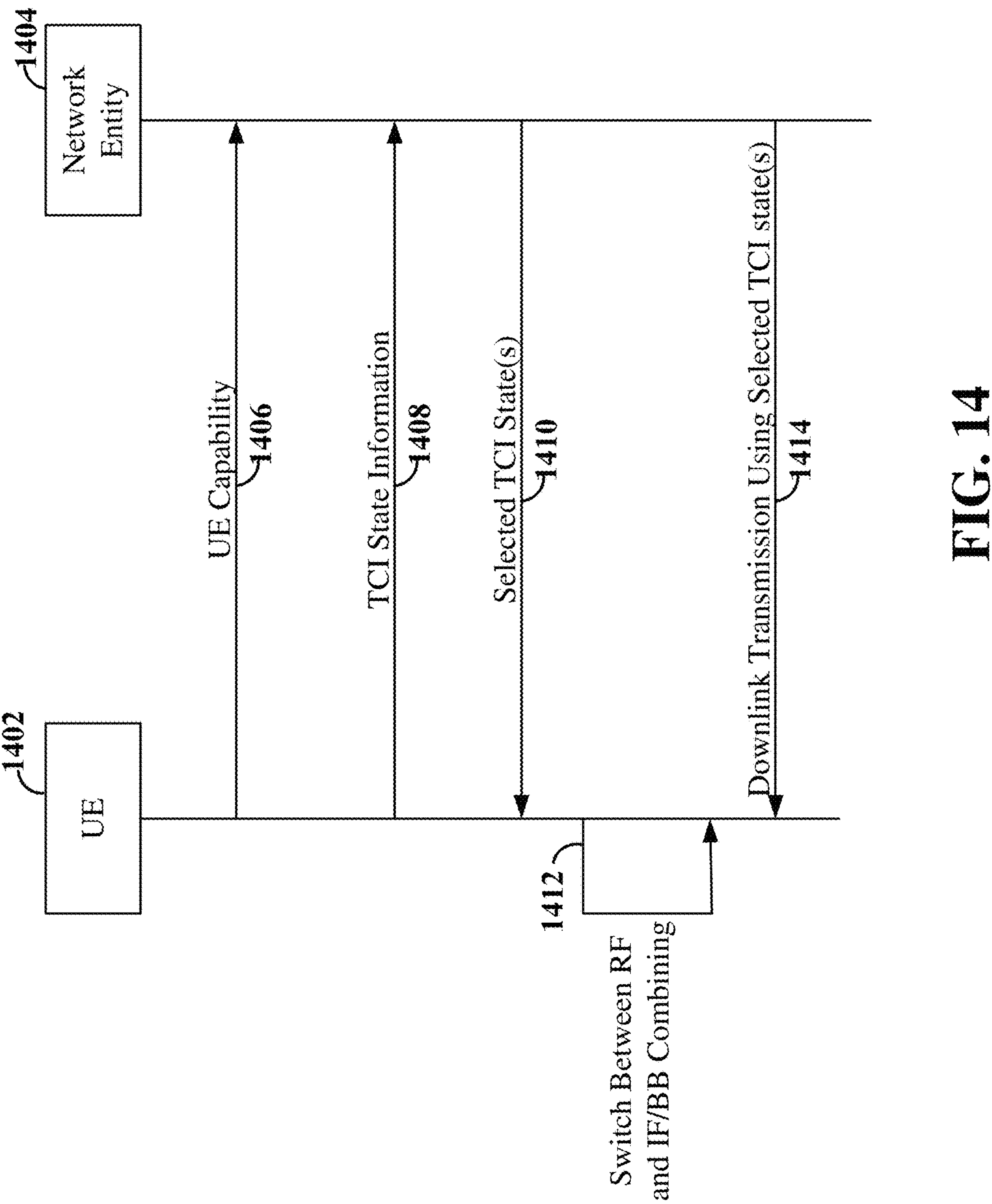
FIG. 14 is a signaling diagram illustrating exemplary signaling for beam combining type switching based on transmission configuration indication (TCI) state selection according to some aspects according to some aspects.

FIG. 14 is a signaling diagram illustrating exemplary signaling for beam combining type switching based on transmission configuration indication (TCI) state selection according to some aspects according to some aspects. The UE 1402 may correspond to any of the UEs or other wireless communication devices shown in any of FIGS. 1, 3-8C, 11 and/or 12. The network entity 1404 may correspond to any of the base stations or other network entities shown in FIGS. 1, 3, 4, 11, and/or 12. For example, the network entity 1404 may correspond to an aggregated base station, an RU, a DU, a CU, a TRP, an IAB node, or other network device.

At 1406, the UE 1402 may optionally transmit a UE capability to the network entity 1404. The UE capability may indicate that the UE supports one or more of RF combining, IF combining, or BB combining of beamformed signals across one or more antenna modules (or antenna module sections) of the UE 1402.

At 1408, the UE 1402 may further transmit TCI state information to the network entity 1404. The TCI state information may include respective sets of one or more TCI states for each of the beam combining types supported by the UE 1402. Each TCI state included in the TCI state information may be a recommended TCI state for the network entity 1404 to use for downlink transmissions to the UE 1402 based on the beam combining type implemented at the UE 1302. For example, the TCI state information may include a single TCI state (e.g., for RF combining) and multiple TCI states (e.g., for IF/BB combining) based on the UE supporting RF and IF/BB combining. In some examples, the TCI state information may include respective sets of multiple TCI states, one for IF combining and one for BB combining.

At 1410, the network entity 1404 may provide one or more selected TCI states for a downlink transmission to the UE 1402. For example, the network entity may select the one or more selected TCI states from the TCI state information provided by the UE 1402. In an example, the network entity may select a single TCI state from the TCI state information to implement RF combining at the UE. In other examples, the network entity may select multiple TCI states from the TCI state information to implement IF or BB combining at the UE. In some examples, the network entity may include the selected TCI state(s) within DCI scheduling the downlink transmission.

At 1412, upon receiving the one or more selected TCI states for the downlink transmission, the UE 1402 may switch between RF combining and IF/BB combining. For example, if the one or more selected TCI states includes a single TCI state (e.g., the single TCI state associated with RF combining included in the TCI state information), the UE 1402 may switch to RF combining. As another example, if the one or more selected TCI states includes two or more TCI states (e.g., the TCI states associated with IF or BB combining included in the TCI state information), the UE 1402 may switch to IF or BB combining. As yet another example, if the one or more selected TCI states includes the TCI states associated with IF combining included in the TCI state information, the UE 1402 may switch to IF combining. Similarly, the UE 1402 may switch to BB combining if the one or more selected TCI states includes the TCI states associated with BB combining included in the TCI state information.

At 1414, the network entity 1404 may provide the downlink transmission to the UE 1402 using the one or more selected TCI states based on the TCI state information. For example, the network entity may use the single TCI state (e.g., for RF combining) or the multiple TCI states (e.g., for IF/BB combining) included in the TCI state information to transmit the downlink transmission.

Figure 15:
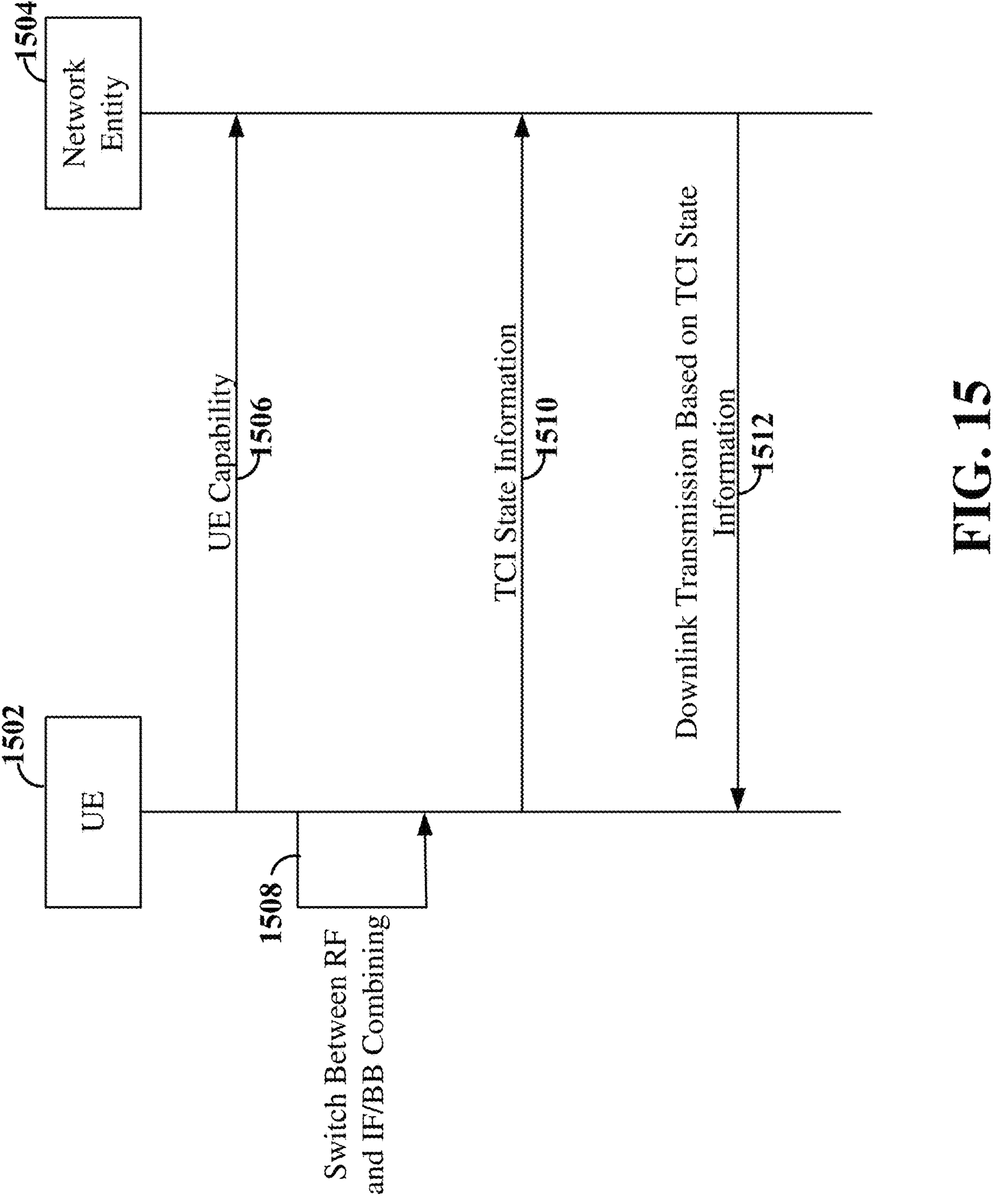
FIG. 15 is a signaling diagram illustrating exemplary signaling for transmission configuration indication (TCI) state selection based on a current UE beam combining type according to some aspects according to some aspects.

FIG. 15 is a signaling diagram illustrating exemplary signaling for transmission configuration indication (TCI) state selection based on a current UE beam combining type according to some aspects according to some aspects. The UE 1502 may correspond to any of the UEs or other wireless communication devices shown in any of FIGS. 1, 3-8C, 11 and/or 12. The network entity 1504 may correspond to any of the base stations or other network entities shown in FIGS. 1, 3, 4, 11, and/or 12. For example, the network entity 1504 may correspond to an aggregated base station, an RU, a DU, a CU, a TRP, an IAB node, or other network device.

At 1506, the UE 1502 may optionally transmit a UE capability to the network entity 1504. The UE capability may indicate that the UE supports one or more of RF combining, IF combining, or BB combining of beamformed signals across one or more antenna modules (or antenna module sections) of the UE 1502.

At 1508, the UE 1502 may switch between RF combining and IF/BB combining. For example, the UE 1502 may decide to switch between RF combining and IF/BB combining based on one or more UE factors, as shown in FIG. 9, to select a selected UE beam combining type. In some examples, the UE 1502 may use the process shown in FIG. 10 to switch between RF combining and IF/BB combining to select the selected UE beam combining type.

At 1510, the UE 1502 may further transmit TCI state information in accordance with the selected UE beam combining type to the network entity 1504. The TCI state information may include, for example, a single TCI state (e.g., if the selected UE beam combining type is RF combining) or multiple TCI states (e.g., if the selected UE beam combining type is IF or BB combining). Each TCI state included in the TCI state information may be a recommended TCI state for the network entity 1504 to use for downlink transmissions to the UE 1502 based on the selected beam combining type At 1512, the network entity 1504 may provide a downlink transmission to the UE 1502 using one or more selected TCI states based on the TCI state information. For example, the network entity may select the one or more selected TCI states from the TCI state information provided by the UE 1502. In an example, the network entity may select a single TCI state from the TCI state information if the single TCI state is provided in the TCI state information based on the UE selecting RF combining. In other examples, the network entity may select multiple TCI states from the TCI state information if the multiple TCI states are provided in the TCI state information based on the UE selecting IF/BB combining. In some examples, the network entity may include the selected TCI state(s) within downlink control information (DCI) scheduling the downlink transmission.

Figure 16:
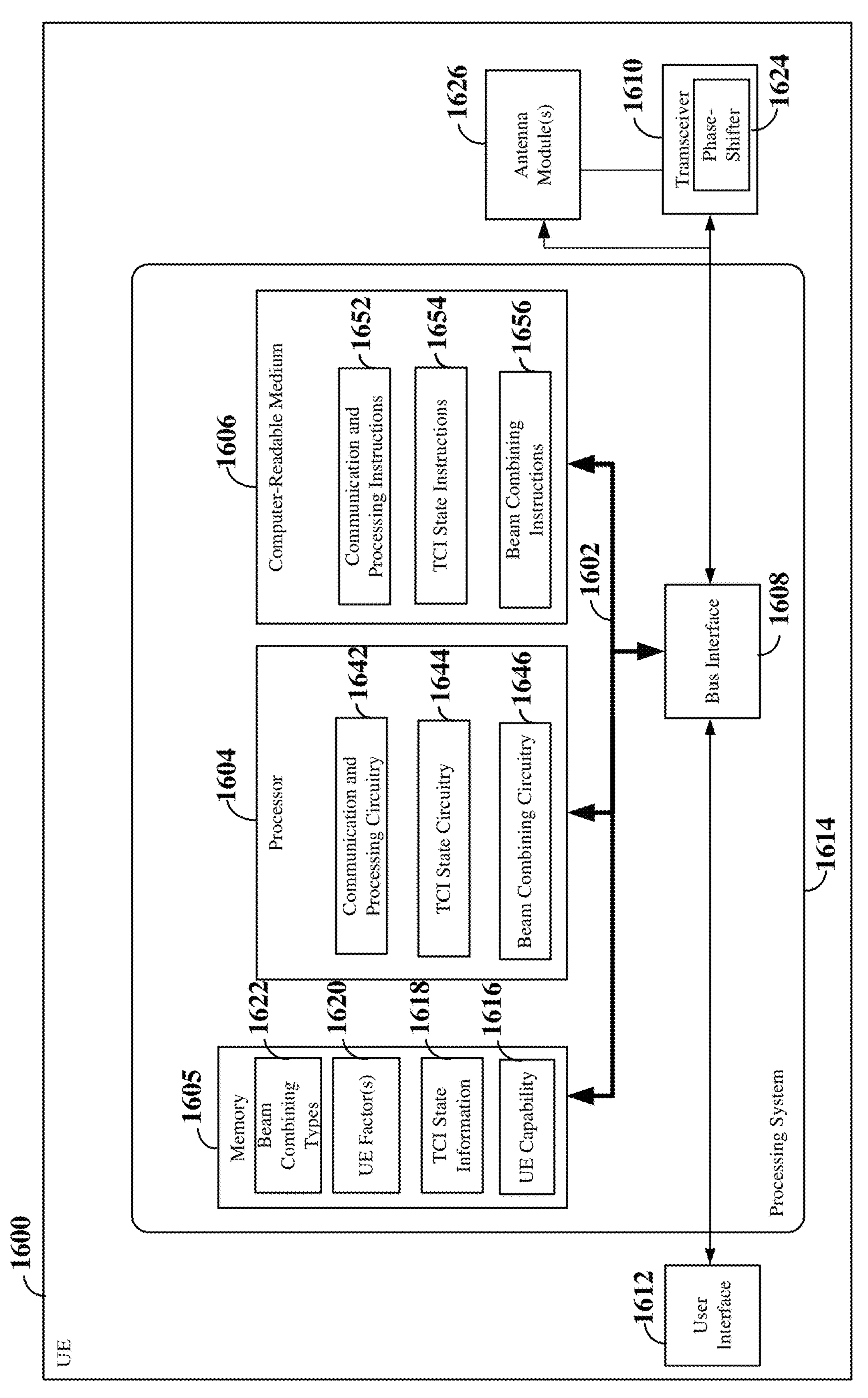
FIG. 16 is a block diagram illustrating an example of a hardware implementation for a wireless communication device employing a processing system according to some aspects.

FIG. 16 is a block diagram illustrating an example of a hardware implementation of a user equipment (UE) 1600 employing a processing system 1614 according to some aspects. For example, the UE 1600 may correspond to any of the UEs shown and described above in reference to FIGS. 1, 3, 4, 6, 7, and/or 12.

In accordance with various aspects of the disclosure, an element, or any portion of an element, or any combination of elements may be implemented with a processing system 1614 that includes one or more processors, such as processor 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1600 may be configured to perform any one or more of the functions described herein. That is, the processor 1604, as utilized in the UE 1600, may be used to implement any one or more of the methods or processes described and illustrated, for example, in FIGS. 12 and/or 14.

The processor 1604 may in some instances be implemented via a baseband or modem chip and in other implementations, the processor 1604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits, including one or more processors (represented generally by the processor 1604), one or more memories (represented generally by the memory 1605), and one or more computer-readable media (represented generally by the computer-readable medium 1606). In some examples, the computer-readable media 1606 may be included within or part of one or more of the memories 1605. The bus 1602 may also link various other circuits such as timing sources, peripherals, voltage regulators, and power management circuits, which are well known in the art, and therefore, are not described any further.

A bus interface 1608 provides an interface between the bus 1602, one or more transceivers 1610, and one or more antenna modules (e.g., one or more antenna arrays or panels) 1626. The transceiver 1610 and antenna module(s) 1626 provides a means for communicating with various other apparatus over a transmission medium (e.g., air interface). The bus interface 1608 further provides an interface between the bus 1602 and a user interface 1612 (e.g., keypad, display, touch screen, speaker, microphone, control features, etc.). Of course, such a user interface 1612 may be omitted in some examples.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. In some examples, the computer-readable medium 1606 may be part of the memory 1605. Those skilled in the art will recognize how best to implement the described functionality presented throughout this disclosure depending on the particular application and the overall design constraints imposed on the overall system. In some examples, the computer-readable medium 1606 may be implemented on an article of manufacture, which may further include one or more other elements or circuits, such as the processor 1604 and/or memory 1605.

The computer-readable medium 1606 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1604, may be responsible for managing the bus 1602 and general processing, including the execution of the software (e.g., instructions or computer-executable code) stored on the computer-readable medium 1606. The software, when executed by the processor 1604, causes the processing system 1614 to perform the various processes and functions described herein for any particular apparatus. The computer-readable medium 1606 and/or the memory 1605 may also be used for storing data that may be manipulated by the processor 1604 when executing software. For example, the memory 1605 may store one or more of a UE capability 1616, TCI state information 1618, UE factor(s) 1620, and/or beam combining types 1622.

In some aspects of the disclosure, the processor 1604 may include circuitry configured for various functions. For example, the processor 1604 may include communication and processing circuitry 1642 configured to communicate with one or more UEs and/or one or more network entities. In some examples, the communication and processing circuitry 1642 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1642 may include one or more transmit/receive chains.

In some implementations where the communication involves receiving information, the communication and processing circuitry 1642 may obtain information from a component of the UE 1600 (e.g., from the transceiver 1610 that receives the information via radio frequency signaling or some other type of signaling suitable for the applicable communication medium), process (e.g., decode) the information, and output the processed information. For example, the communication and processing circuitry 1642 may output the information to another component of the processor 1604, to the memory 1605, or to the bus interface 1608. In some examples, the communication and processing circuitry 1642 may receive one or more of signals, messages, other information, or any combination thereof. In some examples, the communication and processing circuitry 1642 may receive information via one or more channels. In some examples, the communication and processing circuitry 1642 may include functionality for a means for receiving. In some examples, the communication and processing circuitry 1642 may include functionality for a means for processing, including a means for demodulating, a means for decoding, etc.

In some implementations where the communication involves sending (e.g., transmitting) information, the communication and processing circuitry 1642 may obtain information (e.g., from another component of the processor 1604, the memory 1605, or the bus interface 1608), process (e.g., modulate, encode, etc.) the information, and output the processed information. For example, the communication and processing circuitry 1642 may output the information to the transceiver 1610 (e.g., that transmits the information via radio frequency signaling or some other type of signaling suitable for the applicable communication medium). In some examples, the communication and processing circuitry 1642 may send one or more of signals, messages, other information, or any combination thereof. In some examples, the communication and processing circuitry 1642 may send information via one or more channels. In some examples, the communication and processing circuitry 1642 may include functionality for a means for sending (e.g., a means for transmitting). In some examples, the communication and processing circuitry 1642 may include functionality for a means for generating, including a means for modulating, a means for encoding, etc.

In some examples, the communication and processing circuitry 1642 may be configured to receive and process downlink beamformed signals at a mmWave frequency or a sub-6 GHz frequency via the transceiver 1610 and the antenna module(s) 1626 (e.g., using a phase-shifter 1624). In addition, the communication and processing circuitry 1642 may be configured to generate and transmit uplink beamformed signals at a mmWave frequency or a sub-6 GHz frequency via the transceiver 1610 and antenna module(s) 1626 (e.g., using the phase-shifter 1624).

In some examples, the communication and processing circuitry 1642 may be configured to transmit, to a network entity (e.g., aggregated or disaggregated base station gNB, TRP(s), etc.), transmission configuration indicator (TCI) state information 1618. The TCI state information 1618 can include at least one of a single TCI state or multiple TCI states based on the UE supporting one or more of radio frequency (RF) combining, intermediate frequency (IF) combining, or baseband (BB) combining of beamformed signals across one or more of the antenna modules 1626 of the UE 1600. In some examples, the communication and processing circuitry 1642 may be configured to transmit UCI, a radio resource control (RRC) message, or a MAC-CE including the TCI state information 1618. The TCI state information 1618 may further be stored within, for example, memory 1605.

In some examples, the communication and processing circuitry 1642 may be configured to transmit, to a network entity, a UE capability 1616 indicating whether the UE supports one or more of RF combining, IF combining, or BB combining. The UE capability 1616 may further be stored within, for example, memory 1605.

The communication and processing circuitry 1642 may further be configured to receive, from the network entity, a downlink transmission. The downlink transmission may be sent to the UE 1600 using one or more selected TCI states based on the TCI state information 1618. The communication and processing circuitry 1642 may further be configured to execute communication and processing software 1652 stored on the computer-readable medium 1606 to implement one or more functions described herein.

The processor 1604 may further include TCI state circuitry 1644, configured to determine the TCI state information 1618. For example, the TCI state circuitry 1644 may be configured to determine the TCI state information 1618 based on one or more beam combining types 1622 supported by the UE 1600. The supported beam combining types 1622 (e.g., RF combining, IF combining, and/or BB combining) may be stored, for example, in memory 1605. In some examples, the TCI state circuitry 1644 may determine a respective set of one or more TCI states for each of the supported beam combining types 1622. In other examples, the TCI state circuitry 1644 may determine a set of one or more TCI states for a current beam combining type 1622 implemented on the UE 1600. In some examples, the TCI state circuitry 1644 may determine the respective set(s) of TCI states using a beam management scheme, as described above in connection with FIG. 4.

For example, the TCI state circuitry 1644 may determine the single TCI state for inclusion in the TCI state information 1618 based on the UE 1600 supporting RF combining (e.g., the current beam combining type 1622 being RF combining). In this example, the beamforming architecture of the UE 1600 may include one or more antenna modules 1626 (or antenna module sections) controlled by a single RFIC chip (e.g., as shown in FIG. 8B or 8C).

As another example, the TCI state circuitry 1644 may determine the multiple TCI states for inclusion in the TCI state information 1618 based on the UE supporting at least one of IF combining or BB combining (e.g., the current beam combining type 1622 being IF combining or BB combining). In this example, the beamforming architecture of the UE 1600 may include multiple antenna modules 1626, each controlled by a different respective RFIC chip (e.g., as shown in FIG. 8A).

As another example, the TCI state circuitry 1644 may determine both the single TCI state and the multiple TCI states for inclusion in the TCI state information 1618 based on the UE 1600 supporting both RF combining and at least one of IF combining or BB combining. In this example, the current beam combining type 1622 implemented on the UE 1600 may be identified based on the one or more selected TCI states provided by the network entity. In addition, in this example, the beamforming architecture of the UE 1600 may include one or more antenna modules 1626 (e.g., each with one or more antenna module sections) capable of implementing RF combining, IF combining, or BB combining. The TCI state circuitry 1644 may further be configured to execute TCI state instructions (software) 1654 stored on the computer-readable medium 1606 to implement one or more functions described herein.

The processor 1604 may further include beam combining circuitry 1646, configured to switch between the different beam combining types 1622 supported by the UE 1600. In some examples, the beam combining circuitry 1646 may be configured to switch between RF combining and at least one of IF combining or BB combining based on the one or more selected TCI states received from the network entity for the downlink transmission. In other examples, the beam combining circuitry 1646 may be configured to switch between the RF combining and at least one of the IF combining or the BB combining based on one or more UE factors 1620 to select a selected UE beam combining type 1622. The UE factors 1620 may be stored, for example, in memory 1605. Examples of the UE factors 1620 include, but are not limited to, a number of RFIC chips on the UE, feedline losses between the one or more antenna modules 1626, a power consumption tolerance of the UE, or a thermal overhead tolerance of the UE. Additional UE factors 1620 may include the UE factors shown in FIG. 9 and described in FIG. 10. The beam combining circuitry 1646 may further be configured to execute beam combining instructions (software) 1656 stored on the computer-readable medium 1606 to implement one or more functions described herein.

Figure 17:
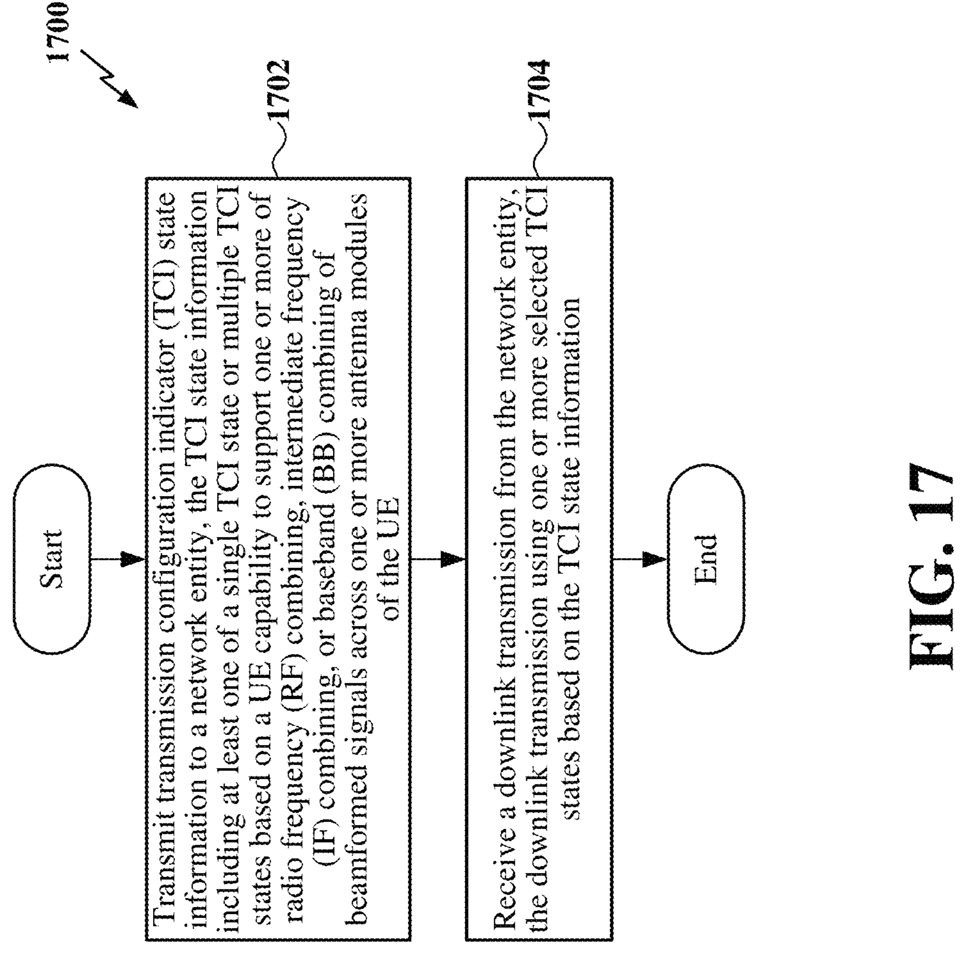
FIG. 17 is a flow chart illustrating an exemplary process for communicating with a network entity based on a UE beam combining type according to some aspects.

FIG. 17 is a flow chart illustrating another exemplary process 1700 for communicating with a network entity based on a UE beam combining type according to some aspects. As described below, some or all illustrated features may be omitted in a particular implementation within the scope of the present disclosure, and some illustrated features may not be required for implementation of all embodiments. In some examples, the process 1700 may be carried out by the UE 1600 illustrated in FIG. 16. In some examples, the process 1700 may be carried out by any suitable apparatus or means for carrying out the functions or algorithm described below.

At block 1702, the UE may transmit transmission configuration indicator (TCI) state information to a network entity. The TCI state information can include at least one of a single TCI state or multiple TCI states based on the UE supporting one or more of radio frequency (RF) combining, intermediate frequency (IF) combining, or baseband (BB) combining of beamformed signals across one or more antenna modules of the UE. In some examples, the UE may further transmit a UE capability to the network entity. The UE capability can indicate whether the UE supports one or more of the RF combining, the IF combining, or the BB combining. For example, the communication and processing circuitry 1642, in combination with the TCI state circuitry 1644 and transceiver 1610, shown and described above in connection with FIG. 16 may provide a means to transmit the TCI state information.

In some examples, the TCI state information includes the single TCI state based on the UE supporting the RF combining. For example, the one or more antenna modules are controlled by a single RF integrated circuit (RFIC) chip. In some examples, the one or more antenna modules can include a co-located antenna module including at least two antenna module sections positioned on different sides of the UE. In some examples, the one or more antenna modules can include a distributed antenna module including at least two antenna module sections coupled via an RF connector.

In some examples, the TCI state information includes the multiple TCI states based on the UE supporting at least one of the IF combining or the BB combining. For example, the one or more antenna modules can include multiple antenna modules, each of the multiple antenna modules being controlled by a different respective RFIC chip. In some examples, the TCI state information includes the single TCI state and the multiple TCI states based on the UE supporting both the RF combining and at least one of the IF combining or the BB combining.

In some examples, the UE can switch between the RF combining and at least one of the IF combining or the BB combining based on one or more UE factors to select a selected UE beam combining type. The UE can further transmit the TCI state information in accordance with the selected UE beam combining type. In some examples, the one or more UE factors include at least one of a number of RFIC chips on the UE, feedline losses between the one or more antenna modules, a power consumption tolerance of the UE, or a thermal overhead tolerance of the UE.

At block 1704, the UE may receive a downlink transmission from the network entity. The downlink transmission can use one or more selected TCI states based on the TCI state information. In some examples, the UE can receive the one or more selected TCI states for the downlink transmission based on the TCI state information, where the one or more selected TCI states includes the single TCI state or the multiple TCI states. The UE can further switch between the RF combining and at least one of the IF combining or the BB combining based on the one or more selected TCI states. For example, the communication and processing circuitry 1642 shown and described above in connection with FIG. 16 may provide a means to receive the downlink transmission.

In one configuration, the UE includes means for transmitting transmission configuration indicator (TCI) state information to a network entity, the TCI state information comprising at least one of a single TCI state or multiple TCI states based on the UE supporting one or more of radio frequency (RF) combining, intermediate frequency (IF) combining, or baseband (BB) combining of beamformed signals across one or more antenna modules of the UE, and means for receiving a downlink transmission from the network entity, the downlink transmission using one or more selected TCI states based on the TCI state information. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 3-8, 11, 12, and/or 16, and utilizing, for example, the processes and/or algorithms described herein in relation to FIGS. 10, 13-15, and/or 17.

Figure 18:
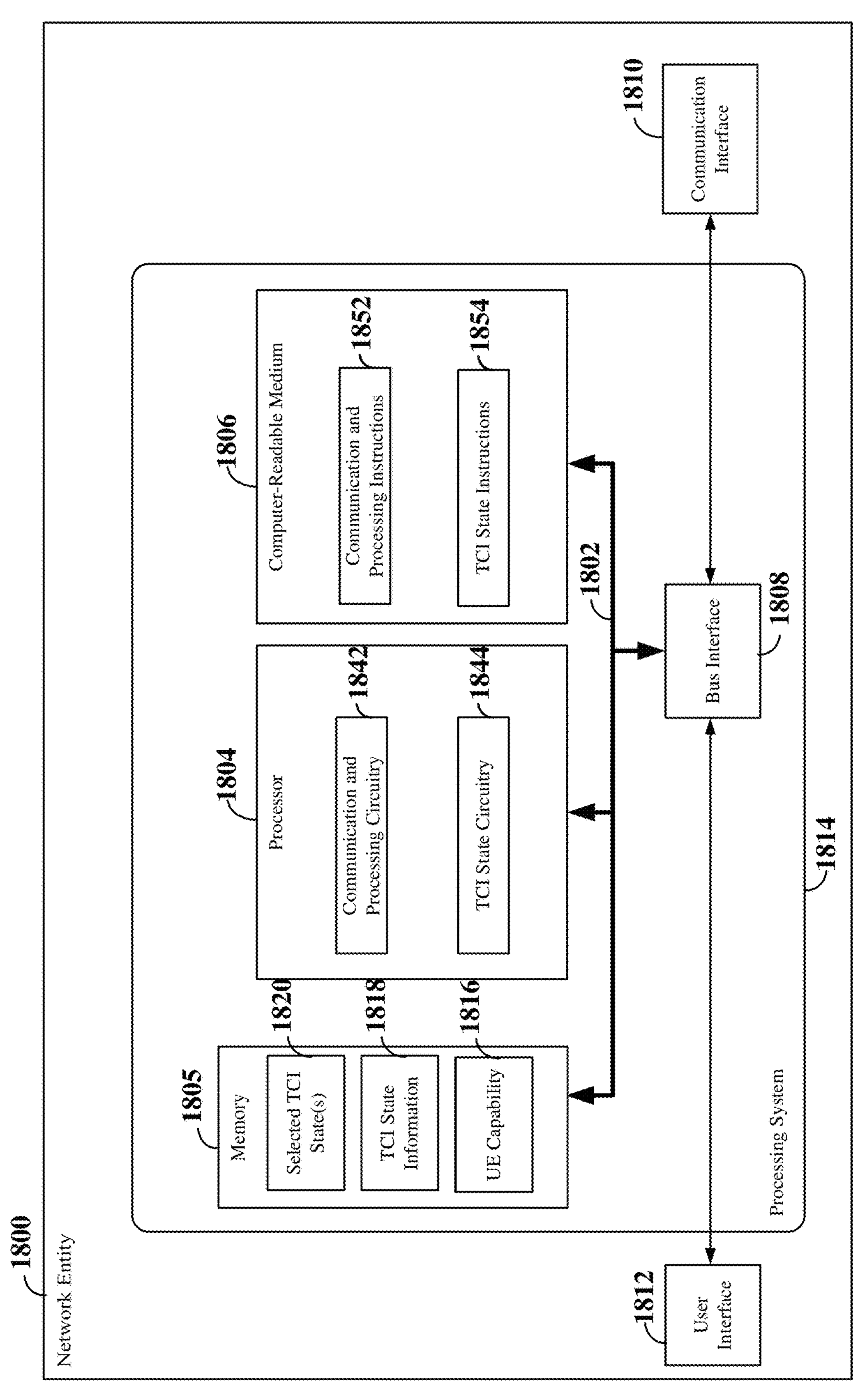
FIG. 18 is a block diagram illustrating an example of a hardware implementation for a network entity employing a processing system according to some aspects.

FIG. 18 is a block diagram illustrating an example of a hardware implementation of a network entity 1800 employing a processing system 1814 according to some aspects. The network entity 1800 may be, for example, a network entity or other network node illustrated in any one or more of FIGS. 1, 3, 4, and/or 11-15. For example, the network entity may be a base station (e.g., gNB, eNB) or other scheduling entity as illustrated in any one or more of FIGS. 1 and/or 3. A network entity may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In addition, a network entity may be a stationary network entity or a mobile network entity.

In accordance with various aspects of the disclosure, an element, or any portion of an element, or any combination of elements may be implemented with a processing system 1814 that includes one or more processors, such as processor 1804. The processing system 1814 may be substantially the same as the processing system 1614 as shown and described above in connection with FIG. 16, including a bus interface 1808, a bus 1802, a memory 1805 (e.g., one or more memories), a processor 1804 (e.g., one or more processors), and a computer-readable medium 1806 (e.g., one or more computer-readable mediums). Accordingly, their descriptions will not be repeated for the sake of brevity. Furthermore, the network entity 1800 may include an optional user interface 1812 and a communication interface 1810 (e.g., wired or wireless), such as one or more transceivers or one or more network interfaces.

The processor 1804, as utilized in the network entity 1800, may be used to implement any one or more of the processes described below. In some examples, the memory 1805 may store a UE capability 1816, TCI state information 1818, and/or selected TCI state(s) 1820.

In some aspects of the disclosure, the processor 1804 may include communication and processing circuitry 1842 configured for various functions, including, for example, communicating with one or more wireless communication devices (e.g., UEs), a core network node, or other network entity. In some examples (e.g., in an aggregated base station architecture), the communication and processing circuitry 1842 may include one or more hardware components that provide the physical structure that performs processes related to wireless communication (e.g., signal reception and/or signal transmission) and/or signal processing (e.g., processing a received signal and/or processing a signal for transmission). In addition, the communication and processing circuitry 1842 may be configured to process and transmit downlink traffic and downlink control and receive and process uplink traffic and uplink control.

In some examples, the communication and processing circuitry 1842 may be configured to obtain transmission configuration indicator (TCI) state information 1818 associated with a user equipment (UE). The TCI state information 1818 can include at least one of a single TCI state or multiple TCI states based on the UE supporting one or more of radio frequency (RF) combining, intermediate frequency (IF) combining, or baseband (BB) combining of beamformed signals across one or more antenna modules of the UE. The communication and processing circuitry 1842 may further store the TCI state information 1818 within, for example, memory 1805.

In some examples, the TCI state information 1818 includes the single TCI state based on the UE supporting the RF combining. In other examples, the TCI state information 1818 includes the multiple TCI states based on the UE supporting at least one of the IF combining or the BB combining. In other examples, the TCI state information 1818 includes the single TCI state and the multiple TCI states based on the UE supporting both the RF combining and at least one of the IF combining or the BB combining.

The communication and processing circuitry 1842 may further be configured to receive a UE capability 1816 of the UE indicating whether the UE supports one or more of the RF combining, the IF combining or the BB combining. The communication and processing circuitry 1842 may further be configured to provide a downlink transmission using one or more selected TCI states 1820 based on the TCI state information 1818. The communication and processing circuitry 1842 may further be configured to provide the one or more selected TCI states 1820 for the downlink transmission based on the TCI state information 1818, where the one or more selected TCI states 1820 includes the single TCI state or the multiple TCI states. The communication and processing circuitry 1842 may further be configured to execute communication and processing software 1852 stored on the computer-readable medium 1806 to implement one or more functions described herein.

The processor 1804 may further include TCI state circuitry 1844, configured to determine or select the one or more selected TCI states 1820 based on the TCI state information 1818. For example, the TCI state circuitry 1844 may select the single TCI state (if provided), the multiple TCI states (if provided), or one of the single TCI state or the multiple TCI states (if both provided). In some examples, the TCI state circuitry 1844 may select between the single and multiple TCI states using a beam management scheme, as described, for example, in FIG. 4. The TCI state circuitry 1844 may further be configured to execute TCI state software 1854 stored on the computer-readable medium 1806 to implement one or more functions described herein.

Figure 19:
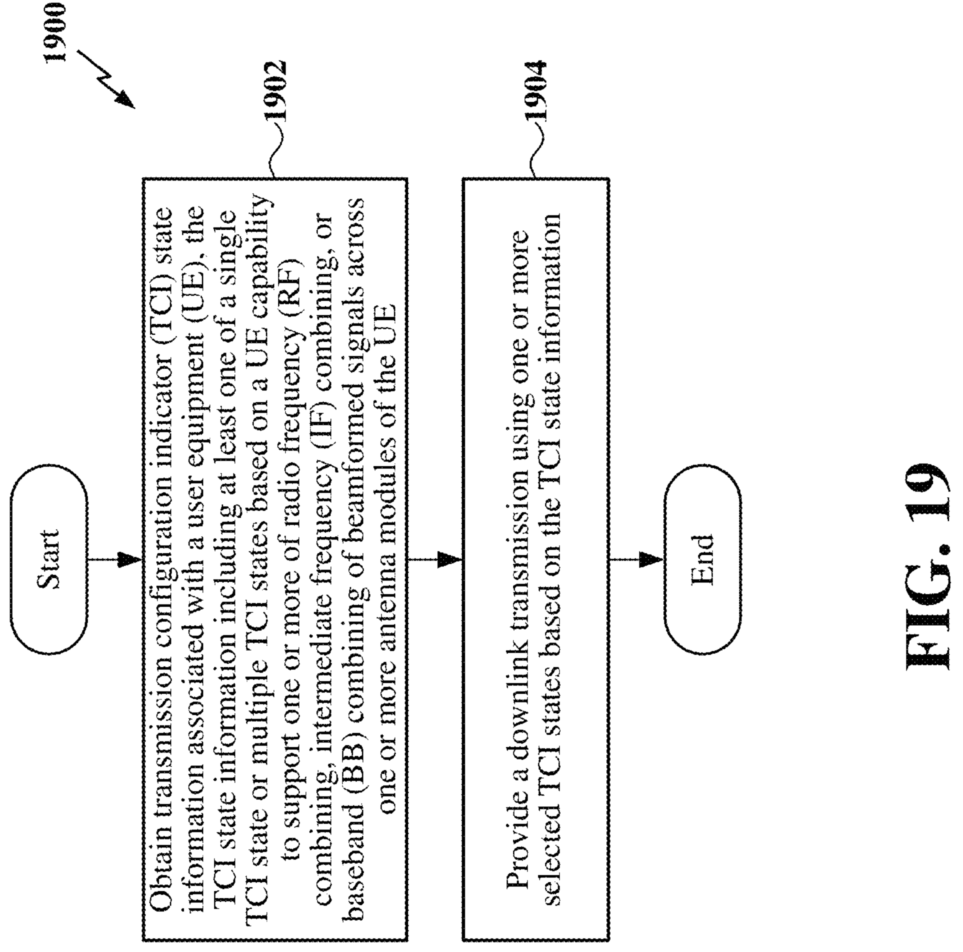
FIG. 19 is a flow chart illustrating an exemplary process for communicating with a UE based on a UE beam combining type according to some aspects.

FIG. 19 is a flow chart illustrating an exemplary process 1900 for communicating with a UE based on a UE beam combining type according to some aspects. As described below, some or all illustrated features may be omitted in a particular implementation within the scope of the present disclosure, and some illustrated features may not be required for implementation of all embodiments. In some examples, the process 1900 may be carried out by the network entity 1800 illustrated in FIG. 18. In some examples, the process 1900 may be carried out by any suitable apparatus or means for carrying out the functions or algorithm described below.

At block 1902, the network entity may obtain transmission configuration indicator (TCI) state information associated with a user equipment (UE). The TCI state information can include at least one of a single TCI state or multiple TCI states based on the UE supporting one or more of radio frequency (RF) combining, intermediate frequency (IF) combining, or baseband (BB) combining of beamformed signals across one or more antenna modules of the UE. In some examples, the network entity may further receive a UE capability indicating whether the UE supports one or more of the RF combining, the IF combining, or the BB combining.

In some examples, the TCI state information includes the single TCI state based on the UE supporting the RF combining. In some examples, the TCI state information includes the multiple TCI states based on the UE supporting at least one of the IF combining or the BB combining. In some examples, the TCI state information includes the single TCI state and the multiple TCI states based on the UE supporting both the RF combining and at least one of the IF combining or the BB combining. For example, the communication and processing circuitry 1842, together with the communication interface 1810, shown and described above in connection with FIG. 18 may provide a means to obtain the TCI state information.

At block 1904, the network entity may provide a downlink transmission using one or more selected TCI states based on the TCI state information. In some examples, the network entity may further provide the one or more selected TCI states for the downlink transmission based on the TCI state information. The one or more selected TCI states can include the single TCI state or the multiple TCI states. For example, the network entity may provide the one or more selected TCI states via DCI scheduling the downlink transmission or via an RRC message scheduling a semi-persistent downlink transmission. For example, the communication and processing circuitry 1842, together with the TCI state circuitry 1844 and communication interface 1810, shown and described above in connection with FIG. 18 may provide a means to provide the downlink transmission.

The following provides an overview of aspects of the present disclosure:

Aspect 1: A method operable at a user equipment (UE), the method comprising: transmitting transmission configuration indicator (TCI) state information to a network entity, the TCI state information comprising at least one of a single TCI state or multiple TCI states based on the UE supporting one or more of radio frequency (RF) combining, intermediate frequency (IF) combining, or baseband (BB) combining of beamformed signals across one or more antenna modules of the UE; and receiving a downlink transmission from the network entity, the downlink transmission using one or more selected TCI states based on the TCI state information.

Aspect 2: The method of aspect 1, further comprising: transmitting a UE capability to the network entity, the UE capability indicating whether the UE supports one or more of the RF combining, the IF combining, or the BB combining.

Aspect 3: The method of aspect 1 or 2, wherein the TCI state information comprises the single TCI state based on the UE supporting the RF combining.

Aspect 4: The method of aspect 3, wherein the one or more antenna modules are controlled by a single RF integrated circuit (RFIC) chip.

Aspect 5: The method of aspect 4, wherein the one or more antenna modules comprise a co-located antenna module comprising at least two antenna module sections positioned on different sides of the UE.

Aspect 6: The method of aspect 4, wherein the one or more antenna modules comprise a distributed antenna module comprising at least two antenna module sections coupled via an RF connector.

Aspect 7: The method of aspect 1 or 2, wherein the TCI state information comprises the multiple TCI states based on the UE supporting at least one of the IF combining or the BB combining.

Aspect 8: The method of aspect 7, wherein the one or more antenna modules comprises multiple antenna modules, each of the multiple antenna modules being controlled by a different respective RFIC chip.

Aspect 9: The method of aspect 1 or 2, wherein the TCI state information comprises the single TCI state and the multiple TCI states based on the UE supporting both the RF combining and at least one of the IF combining or the BB combining.

Aspect 10: The method of aspect 9, further comprising: receiving the one or more selected TCI states for the downlink transmission based on the TCI state information, the one or more selected TCI states comprising the single TCI state or the multiple TCI states; and switching between the RF combining and at least one of the IF combining or the BB combining based on the one or more selected TCI states.

Aspect 11: The method of aspect 1 or 2, further comprising: switching between the RF combining and at least one of the IF combining or the BB combining based on one or more UE factors to select a selected UE beam combining type; and transmitting the TCI state information in accordance with the selected UE beam combining type.

Aspect 12: The method of aspect 11, wherein the one or more UE factors comprise at least one of a number of RFIC chips on the UE, feedline losses between the one or more antenna modules, a power consumption tolerance of the UE, or a thermal overhead tolerance of the UE.

Aspect 13: An apparatus configured for wireless communication at a user equipment (UE) comprising one or more memories and one or more processors coupled to the one or more memories, the one or more processors configured to perform a method of any of aspects 1 through 12.

Aspect 14: An apparatus configured for wireless communication at a user equipment (UE) comprising means for performing a method of any of aspects 1 through 12.

Aspect 15: A non-transitory computer-readable medium having stored therein instructions executable by one or more processors of a user equipment (UE) to perform a method of any one of aspects 1 through 12.

Aspect 16: A method operable at a network entity, the method comprising: obtaining transmission configuration indicator (TCI) state information associated with a user equipment (UE), the TCI state information comprising at least one of a single TCI state or multiple TCI states based on the UE supporting one or more of radio frequency (RF) combining, intermediate frequency (IF) combining, or baseband (BB) combining of beamformed signals across one or more antenna modules of the UE; and providing a downlink transmission using one or more selected TCI states based on the TCI state information.

Aspect 17: The method of aspect 16, further comprising: receiving a UE capability indicating whether the UE supports one or more of the RF combining, the IF combining, or the BB combining.

Aspect 18: The method of aspect 16 or 17, wherein the TCI state information comprises the single TCI state based on the UE supporting the RF combining.

Aspect 19: The method of aspect 16 or 17, wherein the TCI state information comprises the multiple TCI states based on the UE supporting at least one of the IF combining or the BB combining.

Aspect 20: The method of aspect 16 or 17, wherein the TCI state information comprises the single TCI state and the multiple TCI states based on the UE supporting both the RF combining and at least one of the IF combining or the BB combining.

Aspect 21: The method of aspect 20, further comprising: providing the one or more selected TCI states for the downlink transmission based on the TCI state information, the one or more selected TCI states comprising the single TCI state or the multiple TCI states.

Aspect 22: An apparatus configured for wireless communication at a network entity comprising one or more memories and one or more processors coupled to the one or more memories, the one or more processors configured to perform a method of any of aspects 16 through 21.

Aspect 23: An apparatus configured for wireless communication at a network entity comprising means for performing a method of any of aspects 16 through 21.

Aspect 24: A non-transitory computer-readable medium having stored therein instructions executable by one or more processors of a network entity to perform a method of any one of aspects 16 through 21.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3-8C, 11-16, and/or 18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication at a user equipment (UE), the apparatus comprising:

one or more antenna modules;

one or more memories; and one or more processors coupled to the one or more memories and the one or more antenna modules, the one or more processors being configured to:

transmit transmission configuration indicator (TCI) state information to a network entity, the TCI state information comprising at least one of a single TCI state or multiple TCI states based on the UE supporting one or more of radio frequency (RF) combining, intermediate frequency (IF) combining, or baseband (BB) combining of beamformed signals across the one or more antenna modules; and receive a downlink transmission from the network entity, the downlink transmission using one or more selected TCI states based on the TCI state information.

2. The apparatus of claim 1, wherein the one or more processors are further configured to:

transmit a UE capability to the network entity, the UE capability indicating whether the UE supports one or more of the RF combining, the IF combining, or the BB combining.

3. The apparatus of claim 1, wherein the TCI state information comprises the single TCI state based on the UE supporting the RF combining.

4. The apparatus of claim 3, wherein the one or more antenna modules are controlled by a single RF integrated circuit (RFIC) chip.

5. The apparatus of claim 4, wherein the one or more antenna modules comprise a co-located antenna module comprising at least two antenna module sections positioned on different sides of the UE.

6. The apparatus of claim 4, wherein the one or more antenna modules comprise a distributed antenna module comprising at least two antenna module sections coupled via an RF connector.

7. The apparatus of claim 1, wherein the TCI state information comprises the multiple TCI states based on the UE supporting at least one of the IF combining or the BB combining.

8. The apparatus of claim 7, wherein the one or more antenna modules comprises multiple antenna modules, each of the multiple antenna modules being controlled by a different respective RFIC chip.

9. The apparatus of claim 1, wherein the TCI state information comprises the single TCI state and the multiple TCI states based on the UE supporting both the RF combining and at least one of the IF combining or the BB combining.

10. The apparatus of claim 9, wherein the one or more processors are further configured to:

receive the one or more selected TCI states for the downlink transmission based on the TCI state information, the one or more selected TCI states comprising the single TCI state or the multiple TCI states; and switch between the RF combining and at least one of the IF combining or the BB combining based on the one or more selected TCI states.

11. The apparatus of claim 1, wherein the one or more processors are further configured to:

switch between the RF combining and at least one of the IF combining or the BB combining based on one or more UE factors to select a selected UE beam combining type; and transmit the TCI state information in accordance with the selected UE beam combining type.

12. The apparatus of claim 11, wherein the one or more UE factors comprise at least one of a number of RFIC chips on the UE, feedline losses between the one or more antenna modules, a power consumption tolerance of the UE, or a thermal overhead tolerance of the UE.

13. A method operable at a user equipment (UE), the method comprising:

transmitting transmission configuration indicator (TCI) state information to a network entity, the TCI state information comprising at least one of a single TCI state or multiple TCI states based on the UE supporting one or more of radio frequency (RF) combining, intermediate frequency (IF) combining, or baseband (BB) combining of beamformed signals across one or more antenna modules of the UE; and receiving a downlink transmission from the network entity, the downlink transmission using one or more selected TCI states based on the TCI state information.

14. The method of claim 13, further comprising:

transmitting a UE capability to the network entity, the UE capability indicating whether the UE supports one or more of the RF combining, the IF combining, or the BB combining.

15. The method of claim 13, wherein the TCI state information comprises the single TCI state based on the UE supporting the RF combining.

16. The method of claim 13, wherein the TCI state information comprises the multiple TCI states based on the UE supporting at least one of the IF combining or the BB combining.

17. The method of claim 13, wherein the TCI state information comprises the single TCI state and the multiple TCI states based on the UE supporting both the RF combining and at least one of the IF combining or the BB combining.

18. The method of claim 17, further comprising:

receiving the one or more selected TCI states for the downlink transmission based on the TCI state information, the one or more selected TCI states comprising the single TCI state or the multiple TCI states; and switching between the RF combining and at least one of the IF combining or the BB combining based on the one or more selected TCI states.

19. The method of claim 13, further comprising:

switching between the RF combining and at least one of the IF combining or the BB combining based on one or more UE factors to select a selected UE beam combining type; and transmitting the TCI state information in accordance with the selected UE beam combining type.

20. The method of claim 19, wherein the one or more UE factors comprise at least one of a number of RFIC chips on the UE, feedline losses between the one or more antenna modules, a power consumption tolerance of the UE, or a thermal overhead tolerance of the UE.

21. An apparatus for wireless communication at a network entity, the apparatus comprising:

one or more memories; and one or more processors coupled to the one or more memories, the one or more processors being configured to:

obtain transmission configuration indicator (TCI) state information associated with a user equipment (UE), the TCI state information comprising at least one of a single TCI state or multiple TCI states based on the UE supporting one or more of radio frequency (RF) combining, intermediate frequency (IF) combining, or baseband (BB) combining of beamformed signals across one or more antenna modules of the UE; and provide a downlink transmission using one or more selected TCI states based on the TCI state information.

22. The apparatus of claim 21, wherein the one or more processors are further configured to:

receive a UE capability indicating whether the UE supports one or more of the RF combining, the IF combining, or the BB combining.

23. The apparatus of claim 21, wherein the TCI state information comprises the single TCI state based on the UE supporting the RF combining.

24. The apparatus of claim 21, wherein the TCI state information comprises the multiple TCI states based on the UE supporting at least one of the IF combining or the BB combining.

25. The apparatus of claim 21, wherein the TCI state information comprises the single TCI state and the multiple TCI states based on the UE supporting both the RF combining and at least one of the IF combining or the BB combining.

26. The apparatus of claim 25, wherein the one or more processors are further configured to:

provide the one or more selected TCI states for the downlink transmission based on the TCI state information, the one or more selected TCI states comprising the single TCI state or the multiple TCI states.

27. A method operable at a network entity, the method comprising:

obtaining transmission configuration indicator (TCI) state information associated with a user equipment (UE), the TCI state information comprising at least one of a single TCI state or multiple TCI states based on the UE supporting one or more of radio frequency (RF) combining, intermediate frequency (IF) combining, or baseband (BB) combining of beamformed signals across one or more antenna modules of the UE; and providing a downlink transmission using one or more selected TCI states based on the TCI state information.

28. The method of claim 27, further comprising:

receiving a UE capability indicating whether the UE supports one or more of the RF combining, the IF combining, or the BB combining.

29. The method of claim 27, wherein the TCI state information comprises the single TCI state based on the UE supporting the RF combining or the multiple TCI states based on the UE supporting at least one of the IF combining or the BB combining.

30. The method of claim 27, wherein the TCI state information comprises the single TCI state and the multiple TCI states based on the UE supporting both the RF combining and at least one of the IF combining or the BB combining, and further comprising:

providing the one or more selected TCI states for the downlink transmission based on the TCI state information, the one or more selected TCI states comprising the single TCI state or the multiple TCI states.

* * * * *